(12) United States Patent
Harvey et al.

(10) Patent No.: US 11,991,851 B2
(45) Date of Patent: May 21, 2024

(54) METHODS, CONTROLLERS, AND MACHINE-READABLE STORAGE MEDIA FOR AUTOMATED COMMISSIONING OF EQUIPMENT

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc, Holladay, UT (US)

( * ) Notice: Subject to any disclaimer, the term of this patent is extended or adjusted under 35 U.S.C. 154(b) by 0 days.

(21) Appl. No.: 18/102,396

(22) Filed: Jan. 27, 2023

(65) Prior Publication Data
US 2023/0180420 A1   Jun. 8, 2023

Related U.S. Application Data

(63) Continuation of application No. 17/190,541, filed on Mar. 3, 2021, now Pat. No. 11,596,079.
(Continued)

(51) Int. Cl.
*H05K 7/14* (2006.01)
*F24F 11/32* (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC .. H05K 7/1465; H05K 7/1468; H05K 7/1477; H05K 7/1481; F24F 11/32;
(Continued)

(56) References Cited

U.S. PATENT DOCUMENTS

| | | | |
|---|---|---|---|
| 5,530,643 | A | 6/1996 | Hodorowski |
| 6,275,962 | B1 | 8/2001 | Fuller et al. |

(Continued)

FOREIGN PATENT DOCUMENTS

| | | |
|---|---|---|
| CN | 103926912 A | 7/2014 |
| CN | 206002869 U | 3/2017 |

(Continued)

OTHER PUBLICATIONS

De Meester et al., SERIF:A Semantic Exercise Interchange FormatConference: Proceedings of the 1st International Workshop on LINKed EDucation, Oct. 2015.
(Continued)

*Primary Examiner* — Ramesh B Patel
(74) *Attorney, Agent, or Firm* — Genie Lyons

(57) ABSTRACT

Various embodiments relate to a method, controller, and machine-readable storage medium for verifying controlled devices attached to the controller including one or more of the following: selecting, using a system model that models a system of devices comprising the controlled devices attached to the controller, a grouping of the system of devices to be tested; conducting a test of the grouping to produce a test result for the grouping, wherein conducting the test comprises transmitting a communication to at least one device associated with the grouping; choosing a graphical representation of a portion of the system model from a plurality of graphical representations based on the graphical representation including a representation of the grouping; and displaying, on a user interface, the graphical representation and an indication of the test result.

27 Claims, 18 Drawing Sheets

Related U.S. Application Data

(60) Provisional application No. 63/070,460, filed on Aug. 26, 2020.

(51) Int. Cl.

| | |
|---|---|
| *F24F 11/49* | (2018.01) |
| *F24F 11/63* | (2018.01) |
| *F24F 11/88* | (2018.01) |
| *G01R 31/55* | (2020.01) |
| *G05B 13/02* | (2006.01) |
| *G05B 15/02* | (2006.01) |
| *G05B 19/048* | (2006.01) |
| *G05B 23/02* | (2006.01) |
| *G06F 1/3209* | (2019.01) |
| *G06F 1/3246* | (2019.01) |
| *G06F 3/041* | (2006.01) |
| *G06F 3/0482* | (2013.01) |
| *G06F 3/04847* | (2022.01) |
| *G06F 3/147* | (2006.01) |
| *G06F 8/41* | (2018.01) |
| *G06F 8/51* | (2018.01) |
| *G06F 8/53* | (2018.01) |
| *G06F 8/74* | (2018.01) |
| *G06F 9/4401* | (2018.01) |
| *G06F 30/12* | (2020.01) |
| *G06F 30/13* | (2020.01) |
| *G06F 30/18* | (2020.01) |
| *G06Q 30/0283* | (2023.01) |
| *H02J 3/00* | (2006.01) |
| *H04B 3/46* | (2015.01) |
| *H04L 43/50* | (2022.01) |
| *H04L 67/12* | (2022.01) |
| *H04L 67/125* | (2022.01) |
| *H04L 67/75* | (2022.01) |
| *H04M 3/30* | (2006.01) |
| *H04W 4/80* | (2018.01) |
| *H04W 84/00* | (2009.01) |
| *G06F 30/392* | (2020.01) |
| *G06F 111/04* | (2020.01) |
| *G06F 111/16* | (2020.01) |
| *G06F 113/04* | (2020.01) |
| *G06F 113/16* | (2020.01) |
| *G06F 115/12* | (2020.01) |

(52) U.S. Cl.
CPC .............. *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/04186* (2019.05); *G06F 3/0482* (2013.01); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
CPC . F24F 11/49; F24F 11/63; F24F 11/88; G01R 31/55; G05B 13/0265; G05B 15/02; G05B 19/048; G05B 23/0216; G05B 23/0264; G05B 23/0272; G06F 1/3209; G06F 1/3246; G06F 3/04186; G06F 3/0482; G06F 3/04847; G06F 3/147; G06F 8/436; G06F 8/51; G06F 8/53; G06F 8/74; G06F 9/4418; G06F 30/12; G06F 30/13; G06F 30/18; G06F 30/392; G06F 2111/04; G06F 2111/16; G06F 2113/04; G06F 2113/16; G06F 2115/12; G06Q 30/0283; H02J 3/00; H02J 2310/12; H04B 3/46; H04L 43/50; H04L 67/12; H04L 67/125; H04L 67/75; H04M 3/305; H04W 4/80; H04W 84/00
See application file for complete search history.

(56) References Cited

U.S. PATENT DOCUMENTS

| | | | |
|---|---|---|---|
| 6,301,341 B1 | 10/2001 | Gizara et al. | |
| 6,437,692 B1* | 8/2002 | Petite | G08B 25/007 |
| | | | 702/56 |
| 6,645,066 B2 | 11/2003 | Gutta et al. | |
| 6,891,838 B1* | 5/2005 | Petite | H04L 12/2836 |
| | | | 340/870.02 |
| 7,102,502 B2 | 9/2006 | Autret | |
| 7,304,855 B1 | 12/2007 | Milligan et al. | |
| 7,578,135 B2 | 8/2009 | Mattheis | |
| 7,587,250 B2 | 9/2009 | Coogan et al. | |
| 7,702,421 B2 | 4/2010 | Sullivan et al. | |
| 7,729,882 B2 | 6/2010 | Seem | |
| 7,734,572 B2 | 6/2010 | Wiemeyer et al. | |
| 7,917,232 B2 | 3/2011 | McCoy et al. | |
| 8,024,054 B2 | 9/2011 | Mairs et al. | |
| 8,099,178 B2 | 1/2012 | Mairs et al. | |
| 8,503,943 B2 | 8/2013 | Spanhake | |
| 8,628,239 B2 | 1/2014 | Merrow et al. | |
| 8,643,476 B2 | 2/2014 | Pinn et al. | |
| 8,749,959 B2 | 6/2014 | Riley et al. | |
| 8,782,619 B2 | 7/2014 | Wu et al. | |
| 8,925,358 B2 | 1/2015 | Kasper | |
| 9,441,847 B2 | 9/2016 | Grohman | |
| 9,521,724 B1 | 12/2016 | Berry et al. | |
| 9,602,301 B2 | 3/2017 | Averitt | |
| 9,664,400 B2 | 5/2017 | Wroblewski et al. | |
| 9,678,494 B2 | 6/2017 | Hyde et al. | |
| 9,740,385 B2 | 8/2017 | Fadell et al. | |
| 9,791,872 B2 | 10/2017 | Wang et al. | |
| 9,857,238 B2 | 1/2018 | Malhotra et al. | |
| 9,860,961 B2 | 1/2018 | Chemel et al. | |
| 9,952,573 B2 | 4/2018 | Sloo et al. | |
| 10,042,730 B2 | 8/2018 | Zebian | |
| 10,094,586 B2 | 10/2018 | Pavlovski et al. | |
| 10,223,721 B1 | 3/2019 | Bhatia | |
| 10,334,758 B1 | 6/2019 | Ramirez et al. | |
| 10,512,143 B1 | 12/2019 | Ikehara et al. | |
| 10,528,016 B2 | 1/2020 | Noboa | |
| 10,557,889 B2 | 2/2020 | Montoya et al. | |
| 10,558,183 B2 | 2/2020 | Piaskowski et al. | |
| 10,558,248 B2 | 2/2020 | Adrian | |
| 10,627,124 B2 | 4/2020 | Walser et al. | |
| 10,640,211 B2 | 5/2020 | Whitten et al. | |
| 10,672,293 B2 | 6/2020 | Labutov et al. | |
| 10,687,435 B2 | 6/2020 | Adrian et al. | |
| 10,736,228 B2 | 8/2020 | Kho et al. | |
| 10,892,946 B2 | 1/2021 | Costa et al. | |
| 10,900,489 B2 | 1/2021 | Rendusara et al. | |

(56) References Cited

U.S. PATENT DOCUMENTS

| | | | |
|---|---|---|---|
| 10,943,444 B2 | 3/2021 | Boyd et al. | |
| 10,966,068 B2 | 3/2021 | Tramiel et al. | |
| 10,966,342 B2 | 3/2021 | Lairsey et al. | |
| 10,969,133 B2 | 4/2021 | Harvey | |
| 11,080,336 B2* | 8/2021 | Van Dusen | G06Q 10/10 |
| 11,088,989 B2 | 8/2021 | Gao et al. | |
| 11,222,298 B2* | 1/2022 | Abelow | G06Q 10/067 |
| 11,294,254 B2 | 4/2022 | Patterson et al. | |
| 2003/0020715 A1 | 1/2003 | Sakakura et al. | |
| 2004/0236547 A1 | 11/2004 | Rappaport et al. | |
| 2005/0040247 A1 | 2/2005 | Pouchak | |
| 2007/0096902 A1 | 5/2007 | Seeley et al. | |
| 2007/0162288 A1 | 7/2007 | Springhart et al. | |
| 2008/0183316 A1* | 7/2008 | Clayton | G05B 19/042 |
| | | | 700/90 |
| 2008/0277486 A1 | 11/2008 | Seem et al. | |
| 2009/0189764 A1 | 7/2009 | Keller et al. | |
| 2010/0025483 A1 | 2/2010 | Hoeynck et al. | |
| 2010/0131933 A1 | 5/2010 | Kim et al. | |
| 2011/0087988 A1 | 4/2011 | Ray et al. | |
| 2012/0084231 A1 | 4/2012 | McNaught et al. | |
| 2012/0102472 A1 | 4/2012 | Wu et al. | |
| 2012/0221986 A1 | 8/2012 | Whitford et al. | |
| 2014/0088772 A1 | 3/2014 | Lelkens | |
| 2014/0101082 A1 | 4/2014 | Matsuoka et al. | |
| 2014/0215446 A1 | 7/2014 | Araya et al. | |
| 2014/0277757 A1 | 9/2014 | Wang et al. | |
| 2014/0358291 A1 | 12/2014 | Wells | |
| 2014/0364985 A1 | 12/2014 | Tiwari et al. | |
| 2015/0005952 A1 | 1/2015 | Sasaki et al. | |
| 2015/0059522 A1 | 3/2015 | Hughes | |
| 2015/0081928 A1 | 3/2015 | Wintzell et al. | |
| 2015/0198938 A1 | 7/2015 | Steele et al. | |
| 2015/0199088 A1 | 7/2015 | Chandaria et al. | |
| 2015/0234381 A1 | 8/2015 | Ratilla et al. | |
| 2016/0016454 A1 | 1/2016 | Yang et al. | |
| 2016/0062753 A1 | 3/2016 | Champagne | |
| 2016/0073521 A1 | 3/2016 | Marcade et al. | |
| 2016/0086242 A1 | 3/2016 | Schafer et al. | |
| 2016/0088438 A1 | 3/2016 | O'Keeffe | |
| 2016/0092427 A1 | 3/2016 | Bittmann | |
| 2016/0132308 A1 | 5/2016 | Muldoon | |
| 2016/0179340 A1 | 6/2016 | Ogawa et al. | |
| 2016/0195856 A1 | 7/2016 | Spero | |
| 2016/0205784 A1 | 7/2016 | Kyle et al. | |
| 2016/0209868 A1 | 7/2016 | Hartman et al. | |
| 2016/0295663 A1 | 10/2016 | Hyde et al. | |
| 2017/0075323 A1 | 3/2017 | Shrivastava et al. | |
| 2017/0097259 A1 | 4/2017 | Brown et al. | |
| 2017/0131611 A1 | 5/2017 | Brown et al. | |
| 2017/0176034 A1 | 6/2017 | Hussain et al. | |
| 2017/0235848 A1* | 8/2017 | Van Dusen | G06Q 10/101 |
| | | | 705/12 |
| 2017/0322579 A1 | 11/2017 | Goparaju et al. | |
| 2017/0365908 A1 | 12/2017 | Hughes et al. | |
| 2017/0373875 A1* | 12/2017 | Kolasa | G06F 13/4221 |
| 2018/0005195 A1 | 1/2018 | Jacobson | |
| 2018/0075168 A1 | 3/2018 | Tiwari et al. | |
| 2018/0089172 A1 | 3/2018 | Needham | |
| 2018/0123272 A1 | 5/2018 | Mundt et al. | |
| 2018/0202678 A1 | 7/2018 | Ahuja et al. | |
| 2018/0210429 A1* | 7/2018 | Jundt | H04L 41/0806 |
| 2018/0266716 A1 | 9/2018 | Bender et al. | |
| 2018/0307781 A1 | 10/2018 | Byers et al. | |
| 2018/0350180 A1* | 12/2018 | Onischuk | G07C 13/00 |
| 2019/0087076 A1 | 3/2019 | Dey et al. | |
| 2019/0138704 A1 | 5/2019 | Shrivastava et al. | |
| 2019/0156443 A1 | 5/2019 | Hall | |
| 2019/0173109 A1 | 6/2019 | Wang | |
| 2019/0278442 A1 | 9/2019 | Liang | |
| 2019/0294018 A1 | 9/2019 | Shrivastava et al. | |
| 2020/0003444 A1 | 1/2020 | Yuan et al. | |
| 2020/0018506 A1 | 1/2020 | Ruiz et al. | |
| 2020/0045519 A1* | 2/2020 | Raleigh | H04M 15/765 |
| 2020/0050161 A1 | 2/2020 | Noboa | |
| 2020/0150508 A1 | 5/2020 | Patterson et al. | |
| 2020/0187147 A1 | 6/2020 | Meerbeek et al. | |
| 2020/0221269 A1 | 7/2020 | Tramiel et al. | |
| 2020/0226223 A1 | 7/2020 | Reichl | |
| 2020/0228759 A1 | 7/2020 | Ryan et al. | |
| 2020/0255142 A1 | 8/2020 | Whitten et al. | |
| 2020/0279482 A1 | 9/2020 | Berry et al. | |
| 2020/0287786 A1 | 9/2020 | Anderson et al. | |
| 2020/0288558 A1 | 9/2020 | Anderson et al. | |
| 2020/0342526 A1 | 10/2020 | Ablanczy | |
| 2020/0379730 A1 | 12/2020 | Graham et al. | |
| 2020/0387041 A1 | 12/2020 | Shrivastava et al. | |
| 2020/0387129 A1 | 12/2020 | Chandaria | |
| 2021/0073441 A1 | 3/2021 | Austern et al. | |
| 2021/0081504 A1 | 3/2021 | Mccormick et al. | |
| 2021/0081880 A1 | 3/2021 | Bivins et al. | |
| 2021/0096824 A1* | 4/2021 | Stump | G06F 11/3495 |
| 2021/0182660 A1 | 6/2021 | Amirguliyev et al. | |
| 2021/0248286 A1 | 8/2021 | Poluri et al. | |
| 2021/0383041 A1 | 12/2021 | Harvey et al. | |
| 2021/0400787 A1 | 12/2021 | Abbo et al. | |
| 2022/0058306 A1* | 2/2022 | Mabote | G06F 30/18 |
| 2022/0156653 A1* | 5/2022 | Abelow | G06Q 10/10 |
| 2023/0180420 A1* | 6/2023 | Harvey | G06F 30/12 |
| | | | 700/83 |

FOREIGN PATENT DOCUMENTS

| | | |
|---|---|---|
| CN | 206489622 U | 9/2017 |
| CN | 206489622 U | 9/2017 |
| JP | 6301341 B2 | 3/2018 |
| WO | 2008016500 A3 | 3/2008 |
| WO | 2012019328 A1 | 2/2012 |

OTHER PUBLICATIONS

Gou, Wendy et al., "Wireless mesh networks in intelligent building automation control: a survey." International Journal of Intelligent Control and Systems, vol. 16, No. 1, Mar. 2011, 28-36.

Gou, Wenqi, and Mengchu Zhou, "An emerging technology for improved building automation control, 2009, IEEE International Conference on Systems, Man and Cybernetics", IEEE, 2009, pp. 337-342.

Gungor et al., "Industrial Wireless Sensor Networks: Challenges, Design Principles, and Technical Approaches," IEEE Transactions on Industrial Electronics, vol. 56, No. 10, Oct. 2009.

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

Kalagnanam et al., "A System For Automated Mapping of Bill-of_ Materials Part Numbers", KDD '04: Proceedings of the tenth ACM SIGKDD international conference on Knowledge discovery and data mining, Aug. 2004, pp. 805-810.

Kastner, Wolfgang, et al., "Building Automation System Integration into the Internet of Things, The IoT6 Approach, Its Realization and Validation," Proceedings of the 2014 IEEE Emerging Technology and Factory Automation (ETFA), IEEE, 2014, pp. 1-9 (Year:2014).

Mouser Electronics News Release, Aug. 16, 2018.

Ouf et al., Effectiveness of using WiFi technologies to detect and predict building occupancy, Sust. Buildi. 2, 7 (2017).

RadioMaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi: 10.3390, Mar. 12, 2018.

Shailendra, Eshan et al., "Analyzing home automation and networking technologies," IEEE Potentials 37.1 (2018): pp. 27-33, (Year: 2018).

Siano, P, "Demand response and smart grids—A survey," Renewable and Sustainable Energy Reviews vol. 30, Feb. 2014, pp. 461-478.

(56) References Cited

OTHER PUBLICATIONS

U.S. Appl. No. 15/995,019 (7340.2.2) Office Action dated Jul. 26, 2019.
U.S. Appl. No. 15/995,019 (7340.2.2) Office Action dated Oct. 8, 2020.
U.S. Appl. No. 15/995,019 (7340.2.2) Office Action dated Apr. 15, 2020.
Wang et al., "A Practical Multi-Sensor Cooling Demand Estimation Approach Based on Visual Indoor and Outdoor Information Sensing," Sensors 2018, 18, 3591; doi:10.3390.
Yegulap, Serdar, "What is LLVM? The power behind Swift, Rust, Clang, and more," Infoworld, Mar. 11, 2020.
Amin, Massoud, "Toward self-healing energy infrastructure systems," IEEE Computer Applications in Power 14.1 (2002): pp. 20-28.
BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

* cited by examiner

FIG. 18

METHODS, CONTROLLERS, AND MACHINE-READABLE STORAGE MEDIA FOR AUTOMATED COMMISSIONING OF EQUIPMENT

RELATED APPLICATION

The present application is a continuation of U.S. patent application Ser. No. 17/190,510, filed on Mar. 3, 2021, which claims priority to U.S. Provisional Patent Application No. 63/070,460 filed Aug. 26, 2020, the entire disclosures of which are hereby incorporated by reference herein for all purposes.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to commissioning buildings. More specifically, to setting up sensors in a building and understanding the relationships between devices in the building such that the building can commission itself.

BACKGROUND

Building commissioning is the process of turning on a new building and determining that all the systems work as designed. Commissioning is complex enough that there are a great deal of resources devoted to it—seminars, conferences, whole careers. Typically, heating, ventilation, and air conditioning (HVAC) systems of a building are tested to see if they are wired correctly. These systems may also be balanced, to check that they run as expected within the building structure. This can be a very time-consuming process, as different areas of the building influence each other. For example, if two sensors in two close zones have been mistakenly flipped, the sensor readings may be close enough to what is assumed to be correct that it is not until the building has already been moved into that the error is noticed, at which point it is very difficult to fix; as the fix may involve tearing out walls to get to underlying wiring. Generally, there have been studies exploring the concept of automatic commissioning, however, the methods used to date have typically required an occupancy-free training period, during which the building is subjected to an artificial test regime, which limits the potential for retro-commissioning, or continuous commissioning. Being able to prove that a building is commissioned correctly is important in getting owners to sign off on construction, can lead to energy savings, and, if done with enough provability, can lead to energy and other sorts of discounts from local and state governments, and power companies.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

Embodiments disclosed herein provide systems, methods, and computer-readable media for automated commissioning of various devices, building portions, sensors, and etc.

In embodiments, a method of commissioning equipment and sensors in a physical space is disclosed, the method comprising: providing a controller with computer hardware, and memory in a physical space; providing a device with a device sensor that indicates state of device, the device and the device sensor connected to the controller; providing a space sensor in the physical space, the space sensor indicating state of the physical space, the state of the physical space operationally able to be changed by the device, the space sensor connected to the controller; providing to the controller expected behavior of the device, device sensor, and space sensor; the controller checking that the device is exhibiting expected behavior when turned off; the controller turning the device on, and then checking that the device sensor indicates the device is exhibiting expected behavior when turned on; and the controller checking the state of the space sensor in the physical space to see if state of the physical space has changed as expected by device behavior when turned on.

In embodiments, the controller turns on a second device to check a value that is correlated with the expected behavior of the device.

In embodiments, the memory further comprises a wiring protocol for the device, and the controller checking that the device is exhibiting expected behavior when turned on further comprises the controller understanding the wiring protocol of the device, and the controller checking that device connection to the controller is following the wiring protocol when turned on.

In embodiments, the controller checks that it can communicate with the space sensor and the device sensor, and the controller reports an error when a sensor is not communicating with the controller.

In embodiments, the controller reports an error when a sensor is not communicating with the controller.

In embodiments, an error reported by the controller is displayed on a display device associated with the controller.

In embodiments, the controller reports results on a display device associated with the controller, and wherein the results comprise pass, when expected behavior were produced; there results comprise fail, when expected behavior is not produced; and the results comprise check, when behavior is unclear and manual interpretation is required.

In embodiments, a controller with connector wires is connected to the device and the device sensor, and a controller tests at least one connector wire, the controller test comprising a short circuit test, a cut wire test, or a proper connection test.

In embodiments, an incentive checker is also included, which checks which incentives the physical space qualifies for, based on controller reporting results.

In embodiments, the incentive checker further determines which power company incentives the physical space qualifies for.

In embodiments, the system turns on when pass results meet a threshold.

In embodiments, a model of the physical space is provided within the controller that comprises location of the device, device sensor and space sensor within the physical space, and expected behavior of the device, device sensor, and space sensor.

In embodiments, the model of the physical space further provides information such that sensors can cross-check each other.

In embodiments, an automated commissioning system for a physical space is disclosed with multiple devices comprising: at least one controller, each controller comprising; a processor; a memory in operational communication with the processor; a physical space model, the physical space model comprising for each device a least two of: device wiring protocol; device wiring position in controller; device behavioral data; device error data; nearby sensor values expected in response to device behavioral data; and a commissioning engine having instructions which upon execution by the processor: performs operations that select a device; checks that the device is wired to a correct position on the controller; checks that wires of the device wired to the controller follow the device wiring protocol; checks that the controller controlling the device cause a correct relationship behavior in a nearby sensor; and documents device behavior.

In embodiments, an incentive checker, is disclosed and wherein the incentive checker further comprises an incentive database, commissioning results, an incentive display and an incentive deployer.

In embodiments, the incentive checker checks for incentive available based on commissioning results.

In embodiments, the physical space model further comprises sensor cross check data and wherein the commissioning engine further comprises performing cross-checks on at least two sensors.

In embodiments, a computer-readable storage medium configured with instructions is disclosed which upon execution by one or more processors performs an automated commissioning method, the method comprising: providing a controller with computer hardware, and memory in a physical space; providing a device with a device sensor that indicates state of device, the device and the device sensor connected to the controller; providing a space sensor in the physical space, the space sensor indicating state of the physical space, the state of the physical space operationally able to be changed by the device, the space sensor connected to the controller; providing to the controller expected behavior of the device, device sensor, and space sensor; the controller checking that the device is exhibiting expected behavior when turned off; the controller turning the device on, and then checking that the device sensor indicates the device is exhibiting expected behavior when turned on; and the controller checking the state of the space sensor in the physical space to see if state of the physical space has changed as expected by device behavior when turned on.

In embodiments, results of the commissioning is reported.

In embodiments, an automated commissioning system for a physical space with multiple devices is disclosed, comprising: at least one controller, each controller comprising; a processor; a memory in operational communication with the processor; a physical space model, the physical space model comprising for each device a least two of: device wiring protocol; device wiring position in controller; device behavioral data; device error data; nearby sensor values expected in response to device behavioral data; a commissioning engine having instructions which upon execution by the processor: performs operations that select a device; checks that the device is wired to a correct position on the controller; checks that wires of the device wired to the controller follow the device wiring protocol; checks that the controller controlling the device cause a correct relationship behavior in nearby sensor(s); and document device behavior.

BRIEF DESCRIPTION OF THE FIGURES

FIG. 18 is an exemplary screen shot illustrating applying for incentives available in some implementations of the commissioning process.

DETAILED DESCRIPTION

Disclosed below are representative embodiments of methods, computer-readable media, and systems having particular applicability to automated commissioning. Described embodiments implement one or more of the described technologies.

Various alternatives to the implementations described herein are possible. For example, embodiments described with reference to flowchart diagrams can be altered, such as, for example, by changing the ordering of stages shown in the flowcharts, or by repeating or omitting certain stages.

I. Overview

When originally building a structure, the creation process can include designing the structure and designing and implementing the controllers; teaching the controllers about the devices that will be attached to them; and attaching the building devices to the controllers, such that the building itself understands what is necessary for the commission process. The commissioning process then can be done automatically and systematically. As the process is largely automatic, a full history of the commissioning can be created, including a history of each individual device. Once a building has been commissioned, it can be validated such that the quality of commissioning can be shown to outside entities, such as power companies and governmental entities. Such structures can then prove that they can qualify for various incentives.

The technical character of embodiments described herein will be apparent to one of ordinary skill in the art, and will also be apparent in several ways to a wide range of attentive readers. Some embodiments address technical activities that are rooted in computing technology, such as more quickly and efficiently running automated commissioning systems. This is useful as the commissioning process takes much less time; there is a record of what devices have been commissioned, when they were last commissioned, and what the results were. This historical information is invaluable when recommissioning a building, as the previously used pieces of paper may have been lost, the engineers who previously commissioned the space may have changed jobs, etc. Further, when a single device is added and must be commissioned, it can easily be done without closing down the entire building. Other advantages based on the technical characteristics of the teachings will also be apparent to one of skill from the description provided.

Figure 1:
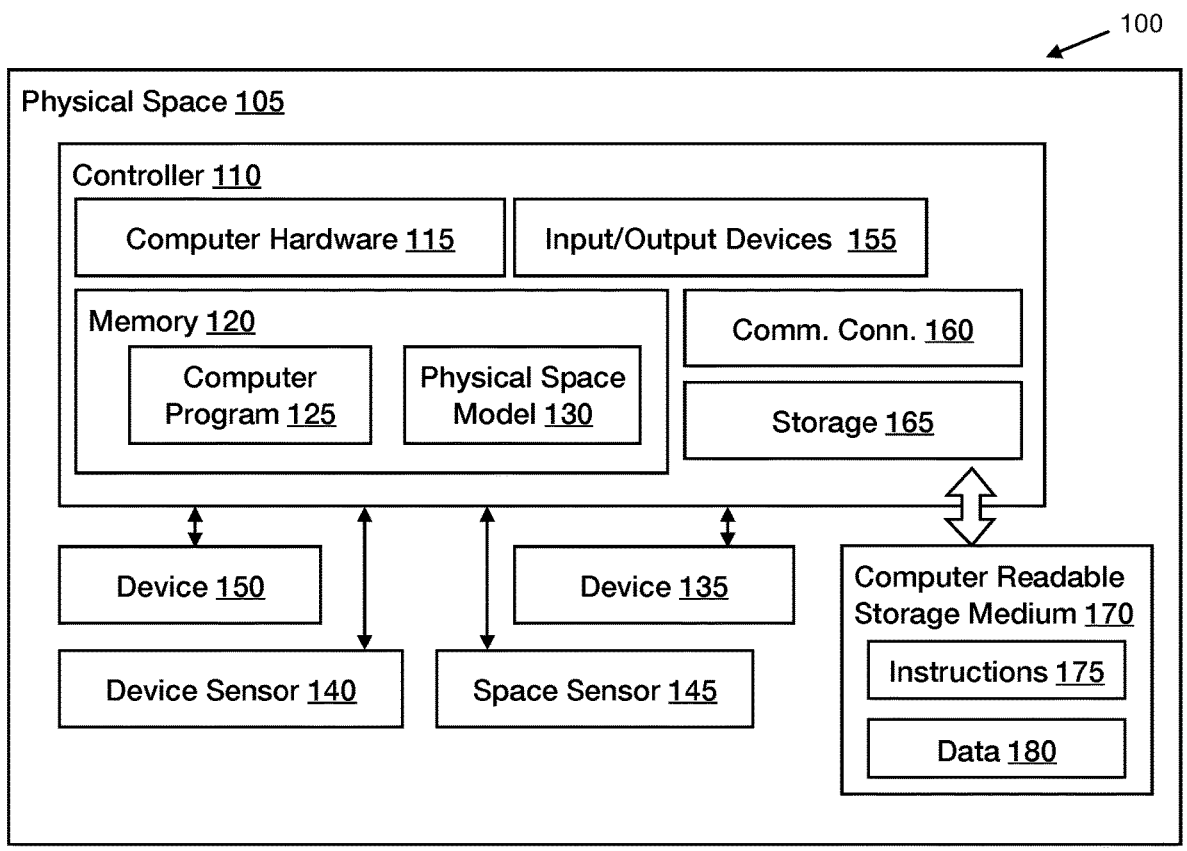
FIG. 1 is a functional block diagram showing an exemplary embodiment of a controller in a physical space in conjunction with which any of the described embodiments can be implemented.

FIG. 1 illustrates aspects of a system architecture 100 which is suitable for use with any of the commissioning embodiments described herein. The system comprises a physical space 105. A "physical space" should be defined generously. It may refer to a single building, a collection of related buildings, buildings and space around them, an outside space such as a garden with irrigation, a portion of a building, such as a floor, a zone, a room, several rooms, etc. The physical space has at least one controller, and maybe many more, deployed within it. The controller(s) comprise computer hardware 115, and memory 120. If there are multiple controllers, they may be connected using a wired network, a wireless network, or a combination. The multiple controllers may run computer programs using a distributed computing system. This distributed computing system may comprise multiple controllers. The controllers may be able to choose a master controller by themselves. If the master controller has problems, such as networking problems, the remaining controllers may be able to choose another master controller. The master controller may be able to chunk programs and distribute them to the other controllers.

The memory 120 can be any appropriate volatile or non-volatile storage subsystem. For example, the memory may be partially or wholly external, may be volatile memory, e.g., static memory cells, as in FPGAs and some CPLDs; or non-volatile memory, e.g., FLASH memory, as in some CPLDs, or in any other appropriate type of memory cell. The memory itself may have within it a model of the physical space 130. This physical space model may be a digital twin, in that the model understands the physical space at a deep level; understanding, for example, the physics of the structure itself, so that it understands how state, such as temperature, diffuses through the structure. It may also understand the location within the physical structure of devices that change state (such as HVAC equipment, lighting, security equipment, etc.) and the nature of the devices at a physics level, such that the projected interaction between the physical space and devices is understood. For example, when a heater is turned on, the physical space model may understand how quickly the heater should heat up, how the heat moves through the building, how the heat from the heater should affect sensors in the physical space, etc.

Storage 165 may also be included. The storage 165 may be removable or non-removable, and includes magnetic disks, magnetic tapes or cassettes, CD-ROMs, CD-RWs, DVDs, flash drives, or any other medium which can be used to store information and which can be accessed within the computing environment 100. The storage 165 stores instructions for the software 185 to implement methods used for automatic commissioning.

At least one of the controller(s) has an input/output device 155. The input/output device 155 is any sort known to those of skill in the art that allows human/computer interaction to occur, such as some combination of a computer screen, a printer, a touchscreen, a mouse, a screen, a keyboard, a printer, etc. The computer controller may also have one or more communication connections 160. These communication connections may be wired networks, wireless networks, and other types of communication connections as known by those of skill in the art.

A controller also has a number of devices 135, 150 associated with it. These devices may be any sort of device that can connect to a controller in a building, as known to those of skill in the art. These may include HVAC equipment, security equipment, entertainment equipment, irrigation equipment, printers, and so on. These devices may pass information from a specific device to the controller and may pass information from the controller to the device. For example, a controller could tell a device to turn on, the device could send the controller error messages, etc. Some devices pass controllers complex information sets about their internal state, etc.

The controller also has a number of sensors associated with it, such as device sensors 140, which may pass information from a specific device to the controller and may pass information from the controller to the device. For example, a controller could tell a device sensor to turn on, the sensor device could send the controller messages about the state of the sensor associated with the device, etc. Some device sensors pass controllers complex information sets about their internal state, etc. Space sensors 145 may also be associated with the controller. These, generally, give information about state of the physical space, or some portion of the physical space. They may also accept information from the controller, and pass information to the controller. In some embodiments, the controller can tell whether the space sensor is working as expected by reading the information the space sensor is sending. In some embodiments, the controller can look at the sensors around a specific sensor and see if the values being sent by a sensor are in line with other sensors. In some embodiments, the controller can tell if the space sensor can turn on and off correctly, send information signals correctly etc. Example of state that state sensors may read include temperature, humidity, noise levels, air flow noise levels, lighting levels, entertainment noise levels, $CO_2$, VOC, and so on. Some of these devices and sensors may be connected by being physically wired to the controller 110, others may be connected by an interface network connection, e.g., 160. This network connection may be a wired connection, such as an ethernet connection, or may be a wireless connection. The controller may be able to determine if the space sensor is wired correctly to the controller.

Computer-readable storage media 170—any available non-transient tangible media that can be accessed within a computing environment—may also be included. Computer readable storage media 170 may comprise instructions 175 and data 180. Data Sources to provide data may be computing devices, such as a general hardware platform servers configured to receive and transmit information over communications connections 160.

II. Exemplary Method for Commissioning a Physical Space Automatically

Figure 2:
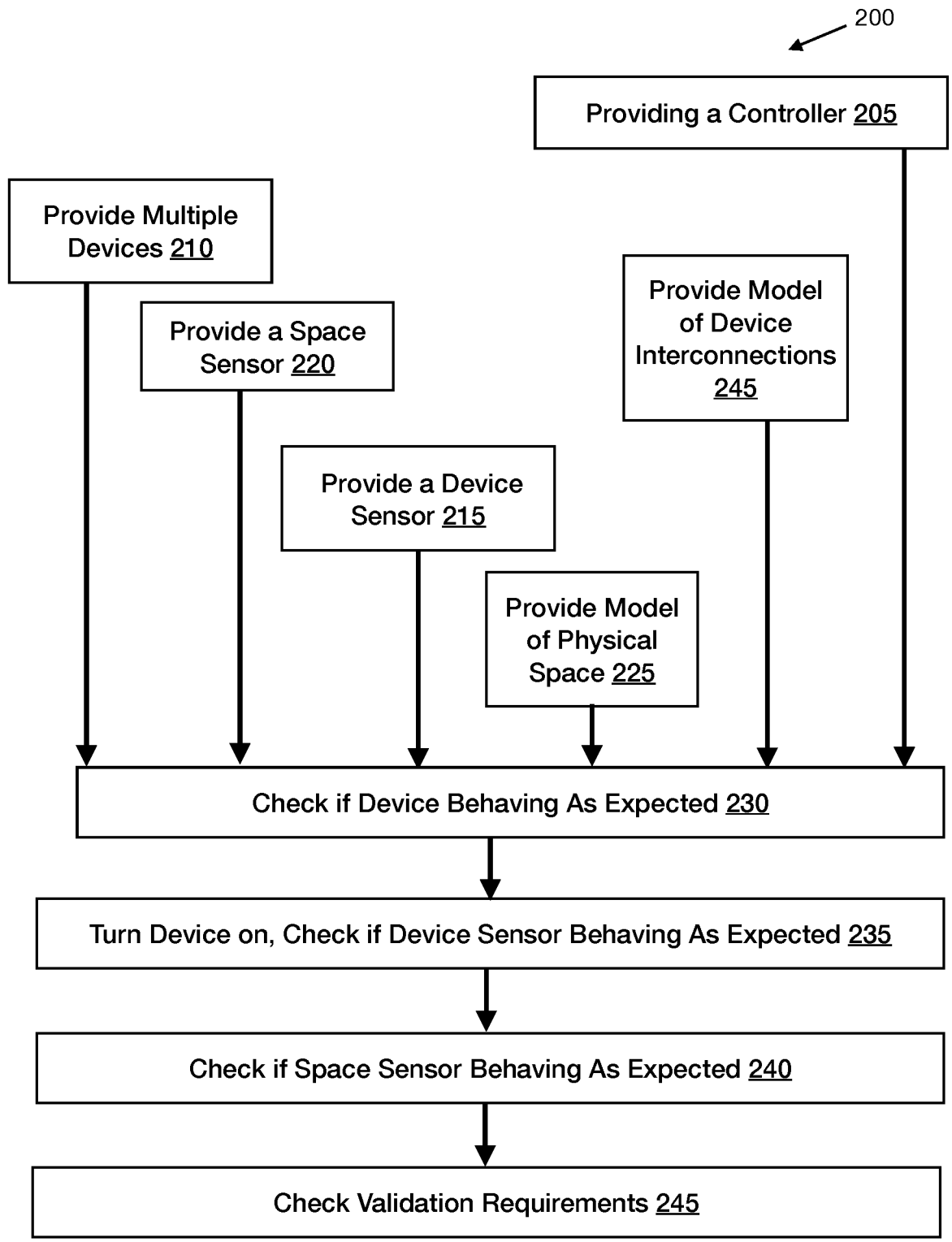
FIG. 2 is an exemplary flowchart of a commissioning process in conjunction with which some described embodiments can be implemented.

FIG. 2 illustrates some method embodiments in a general flowchart 200. Technical methods shown in the Figures or otherwise disclosed will be performed automatically, e.g., by computer programs 125, unless otherwise indicated. Methods may also be performed in part automatically and in part manually to the extent action by a person may be involved, e.g., a person may command that a commissioning process is initiated. No method contemplated as innovative herein is entirely manual. In a given embodiment zero or more illustrated steps of a method may be repeated, perhaps with different devices or models to operate on. Operations in an embodiment may also be done in a different order than the top-to-bottom order that is laid out in FIG. 2. Operations may be performed serially, in a partially overlapping manner, or fully in parallel. The order in which flowchart 200 is traversed to indicate the operations performed during a method may vary from one performance of the method to another performance of the method. The flowchart traversal order may also vary from one method embodiment to another method embodiment. Operations may be performed in parallel, serially, or in a partially overlapping manner. Operations may also be combined, omitted, renamed, regrouped, or otherwise depart from the illustrated flows, provided that the process performed is operable and conforms to at least one claim.

At operation 205, a controller is provided. In some embodiments, this may represent multiple controllers. In some embodiments, at operation 210, multiple devices are provided. In some embodiments, the multiple devices are connected to the controller that is provided in operation 205 or to a different controller in the physical space 105. The controller(s) may control multiple devices. When controlling a device, the controller can, e.g., depending on the device and the controller, turn the devices on, turn the devices off, check that the signals coming from the device in various states is as expected, etc. Examples include the controller signaling a device to enter a certain state (e.g., on, off). The controller may then check to ensure that the device is behaving as expected. For example, the device wires should have certain signals (or lack any signal) when turned off. When the controller turns the device on, other signals may be expected on the wires. Devices may have intermediate states that can be set by the controller, as well.

At operation 215 a device sensor is provided. The controller may also be connected to one or more device sensors that provide information about a device. For example, a controller could tell a hot water heater to turn on high. After a given amount of time, the water in the water heater should have reached some temperature value. A device sensor associated with the hot water heater may be able to communicate the water temperature to the controller 110. The controller may know how hot the water should be if the device has been turned on for a specific amount of time at a specific setting. The device sensor can help the controller verify or falsify that the device is behaving as expected.

At operation 220 a space sensor is provided. The controller may also control at least one space sensor 145, within the physical space 105. A space sensor 145 may be used to measure the state of the physical space. Common space sensors include temperature sensors, humidity sensors, VOC sensors, noise sensors, water sensors, etc., as discussed above.

Figure 4:
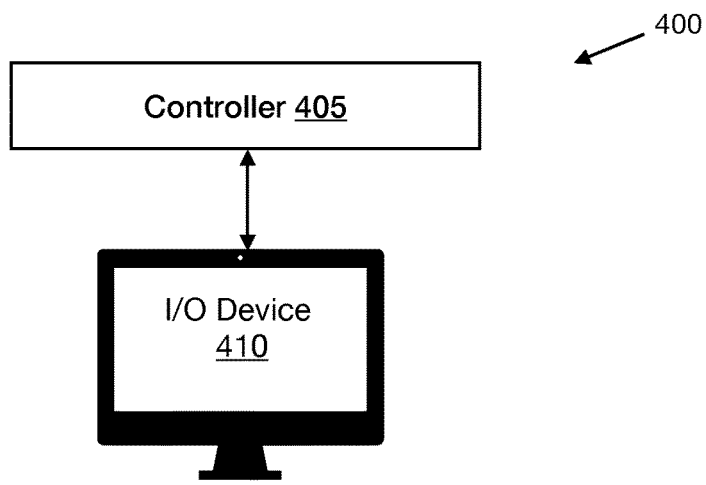
FIG. 4 is an exemplary diagram that describes device-controller interaction.

At operation 225 a model of the physical space 105 may be provided. FIG. 4 is a diagram 400 showing a relationship between a controller 405 and an I/O device 410. Portions of a physical space model may be input into the controller using an I/O device 410. This input device may be any input device as known to those of skill in the art. For example, the input device may be a keyboard and/or a mouse which allows a user to input specifications of the physical space, a three dimensional scanner that scans the space and then inputs it directly into the controller, a digital camera that scans the space, determines the coordinates and then inputs those into the controller. The input device may be a scanner that scans blueprints, or a wired or wireless connection that sends the model of the physical space in a computer-readable form. This information may be sent to the controller using an optical device, a thumb drive, or another type of device that connects directly or indirectly to the controller.

At operation 245 a model of device interconnections is provided. In some embodiments, the controller(s) check if a device is behaving as expected when the device is turned off. The controller memory may have information about expected device behavior in various states; this information may be in a model of device interconnections, or in another location. Among other benefits, this checks if the correct wires are wired to the correct controller connectors.

In some embodiments, the controllers turn a device on 235, using its connection with the controller. The controller may then check if the device is behaving as expected. For example, a device should be producing 10V of output along a specific wire when turned on. The controller(s) then can check that the appropriate voltage is on a given wire, as well as much other information associated with the device-controller connection.

In some embodiments, once a device is turned on, a device sensor associated with the device may also be turned on, or if previously turned on, then checked for its state. If a device is behaving as expected, the device state sensor should be at some value, or within some value range. If the device sensor is not within this range, it may indicate a problem with either the device or the device sensor.

In some embodiments, a space sensor is checked to see if it is behaving as expected 240. Space sensors may be checked against the values of other, e.g., nearby space sensors; space sensors may be checked against the behavior of devices that would affect state around the space sensor; if values are not as expected, then there may be problems with the space sensor, the space itself (which may have an undisclosed flaw), a device, which may not be changing state of the space sufficiently, etc.

In some embodiments, devices have specific requirements for validation. For example, an HVAC system may have air flow validation requirements, filter leak tests, particle counts, and the like. Device sensors or specific state change devices can be placed during construction that allow interaction between the device and the sensor to validate the device. For example, some devices for validation require humidity to be reduced within a certain time. A humidifier can be built initially into the building that then can be used to raise humidity to a high enough level that the humidity-reducing device (such as an air conditioner) can be validated.

Figure 3:
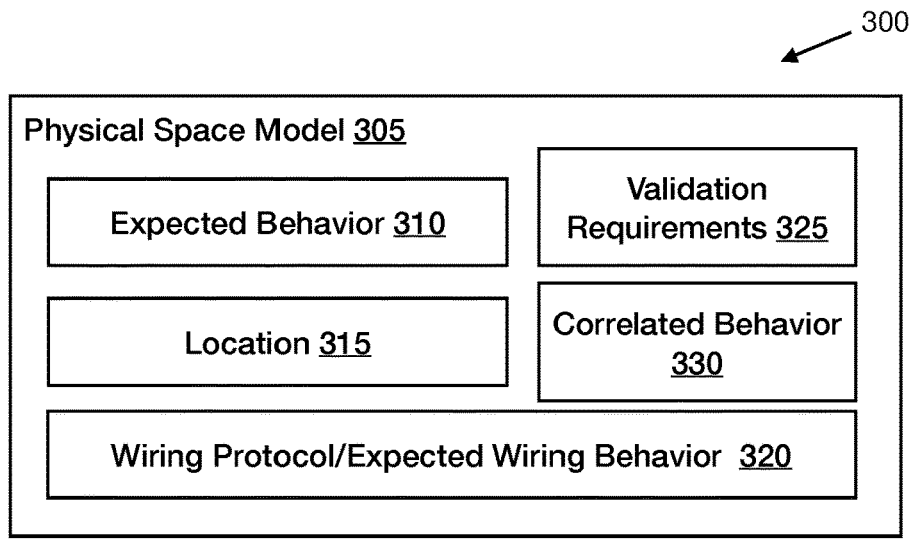
FIG. 3 is an exemplary block diagram that describes some features of a physical space model.

FIG. 3 is a block diagram 300 that discloses aspects of a physical space model. A physical space model 305 (which may be stored in memory 120), comprises, for device(s) and sensor(s), expected behavior of the device or sensor 310, location of the device or sensor 315, and wiring protocol/expected wiring behavior for the device or sensor 320. Devices may have their own validation requirements 325; tests that should be run successfully to officially validate the device. When determining if devices are behaving as expected 230, 235, 240, specific validation tests may be used. When such tests are used, appropriate sensors to test the devices may be incorporated into the initial building design. Correlated behavior 330 between different devices and sensors may also be included. This comprises, for example, sensors that can cross-check each other, sensors whose values should correlate with equipment function, and so on.

Expected behavior comprises (if applicable) at least some of the signals that the device is expected to send to the controller to indicate functions of the device, current and voltage on the wire connection or connections, signals that the device is expected to send back to the controller when the controller sends signals, current and voltage on the wire(s) associated with the device when the device is turned off, current and voltage on the wire(s) associated with the device when the device is turned on, current and voltage on the wire(s) associated with the device when the device is in various states, the protocol the device is expected to follow for sending messages, etc.

Figure 5:
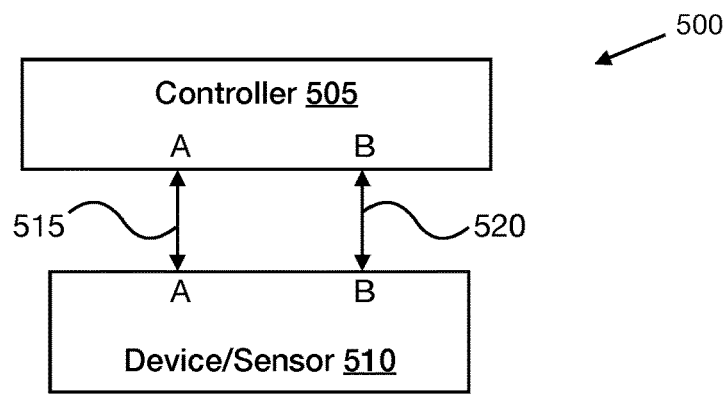
FIG. 5 is an exemplary diagram showing connections between a device/sensor and a controller.

With reference to FIG. 5, in an exemplary embodiment with a one wire device and a one wire sensor, the controller 505 is wired 515, 520 to the device and the sensors 510. Because the physical model understands where each device and sensor is located, what wiring protocols each device and sensor follow and where each should be wired in the controller, the controller can, for a device or a sensor, using software stored within the controller or elsewhere, look at the wiring connection between it and the device and see if it is getting the appropriate signal for each of the wires when the device or sensor is turned off or on. Because the controller understands the signals it should be getting for each wire, in some instances, two devices with the same signal set), if the controller is getting the signals on wire 515 that it expects on 520, it can determine that the wires have been switched. In some embodiments, the controller also understands the set of signals that the device sends for various states, such as error states, and understands what signals the device understands. These are stored in memory 120 in the controller 110 or within another controller that is part of the same distributed system as this controller 110, or within a database that the controller 110 can access through a network connection (not shown) or the input/output device 155, etc.

In some embodiments, the controller can check that it can communicate with the devices (such as sensors) that it is connected to. The controller can then report an error when it finds that a device is not communicating with the controller. The controller can send a signal to a device from the device's wiring pin (or pins) and then see what signal it receives back from the device (or device). If it receives the correct signal, then the controller can communicate with the device. In some instances, if the controller receives an incorrect signal or no signal at all, then the controller cannot communicate with the device(s). In such a case, the controller may report this communication error.

In some embodiments, the controller can also perform, for a connector wire, some combination of: a short circuit test, a cut wire test (also known as an open circuit test) or a proper connection test. The controller 110 comprises a computer program 125 stored in memory 120 and hardware 115 to be able to run the program 125 and perform such tests when a device or sensor is wired to one or more of its connectors.

The controller can determine the current and voltage that the wires are expressing, and can also determine the appropriate current and voltage for the wires associated with a device or sensor. If there is an error in any of these, the controller can indicate that an error has occurred. This indication may comprise writing to a file, displaying that an error has occurred on a display device, printing a report, making a noise, or any other error indication as known by those of skill in the art.

As the controller controls the devices and sensors, the controller can turn each device and sensor on. Once turned on, the controller can determine that the wiring connection is behaving as expected 515, 520 when turned on, which may entail giving the correct signal/voltage and current. If there is an error in any of these, the controller can indicate that an error has occurred. This indication may comprise writing to a file, displaying that an error has occurred on a display device, printing a report, making a noise, or any other error indication as known by those of skill in the art. In some embodiment, the errors the controller finds are reported on a display device.

Figure 6:
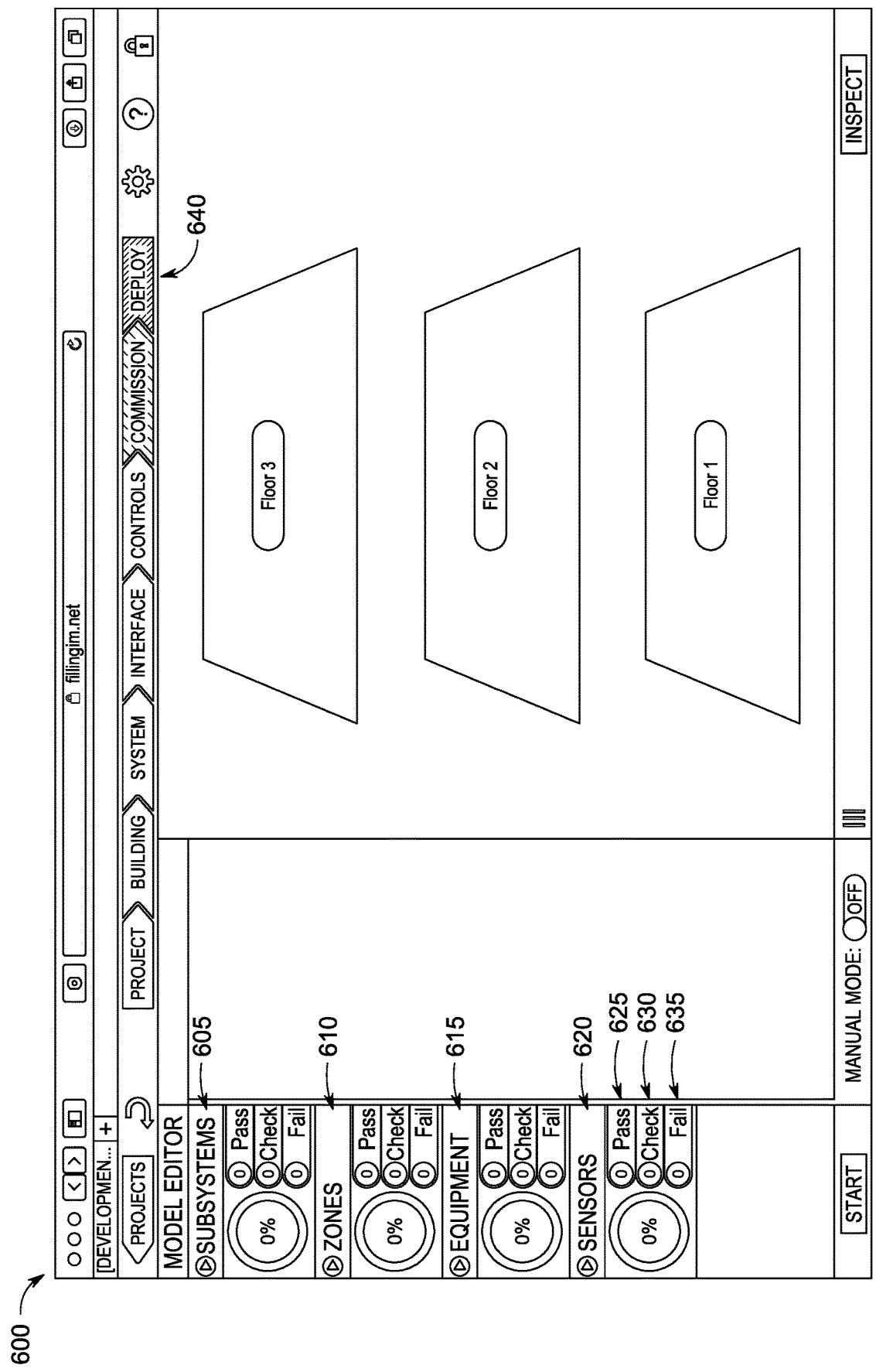
FIG. 6 is an exemplary screen shot illustrating some features of commissioning.

With reference to FIG. 6, an illustrative embodiment of an automatic commissioning progress report screen 600 is disclosed. This screen may be shown on a display device associated with the controller.

In some embodiments, the groupings of objects in the physical space that meet certain criteria are shown. Some possible groupings are subsystems 605, zones 610, equipment 615, and sensors 620. Subsystems may be large groupings, such as floors in a building. Zones may have smaller groupings within the subsystem such as portions of a floor of a building, e.g., living room, kitchen, laundry, etc. Equipment may be devices controllable by the subsystem that are not sensors. Other groupings are possible as well.

In some embodiments, the display changes as portions of the system record their commission results. When a sensor, equipment, zone, or subsystem is tested, its results are displayed as either pass 625, check 630, or fail 635. Pass 625 is indicated where expected behavior was produced. For example, the results could reach a threshold value, such as a numerical value, a percent of a maximum or minimum value, and so on. Pass results, such at the threshold value, may be set by a user, a commissioning standard, a default equipment pass threshold value, etc. Fail 635 is indicated when expected behavior is not produced. Check 630 is indicated when the behavior of the device is unclear and manual interpretation is required. As an example, when testing that an equipment subsystem (e.g., a boiler) can heat its connected zones, the controller may enable the boiler and then check that the temperature on the boiler output (which may be a sensor) increases properly. Corresponding zones to the boiler are expected to see an increase in temperature. If insufficient temperature increase in the sensors of these corresponding zones is recorded, then the results may comprise "check" or "fail". If the controller does not detect enough of an increase in the corresponding zones the results are ambiguous and will require human intervention. In embodiments, devices that are near each other, connect to each other, or both may perform cross check validation. For example temperature sensors in adjoining areas should have temperature values that are within a range of each other. If one sensor value is off by a certain amount, that sensor may fail commissioning. If there are correct relationship behaviors between the sensors then the sensor may pass. If there is a correct relationship between a device and nearby sensors, then the sensor may pass. Many devices have correlated behavior, and as such may be cross-checked against each other.

Once the physical space has passed commissioning, in some embodiments, the building may be turned on to run in its normal fashion by selecting a "deploy" button 640.

Figure 7:
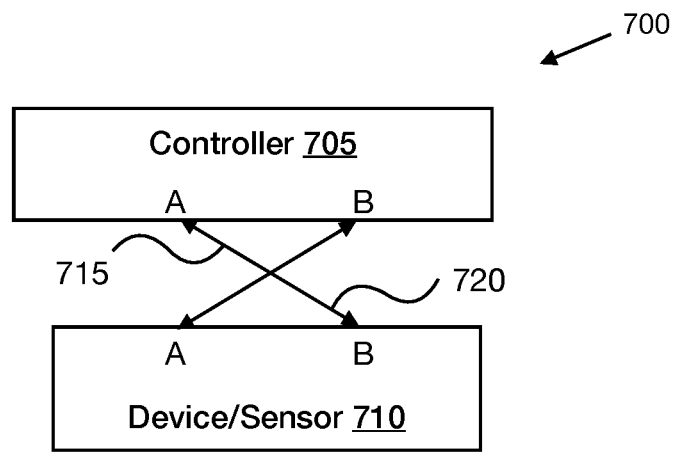
FIG. 7 is an exemplary diagram that describes device-controller interaction.

FIG. 7 is an exemplary diagram 700 that describes device-controller interaction. In some embodiments, when a device (or a sensor) 710 is wired to a controller 705 with multiple wires 715, 720, because the controller understands the signals and current/voltage that are expected to be received on the wires, the commissioning process can determine when the wiring has been swapped, that is, device wire A was expected to be wired to controller wire A but instead has been wired to controller wire pin B, and vice versa. This also works for devices with more wires. In some embodiments, the controller can determine when a device A at wire A has instead been wired to controller location C. In some embodiments, when a device A is expected to be wired to locations a, b, and c, but is wired elsewhere within the controller, the commissioning process will detect this and determine the correct location for the device.

Figure 8:
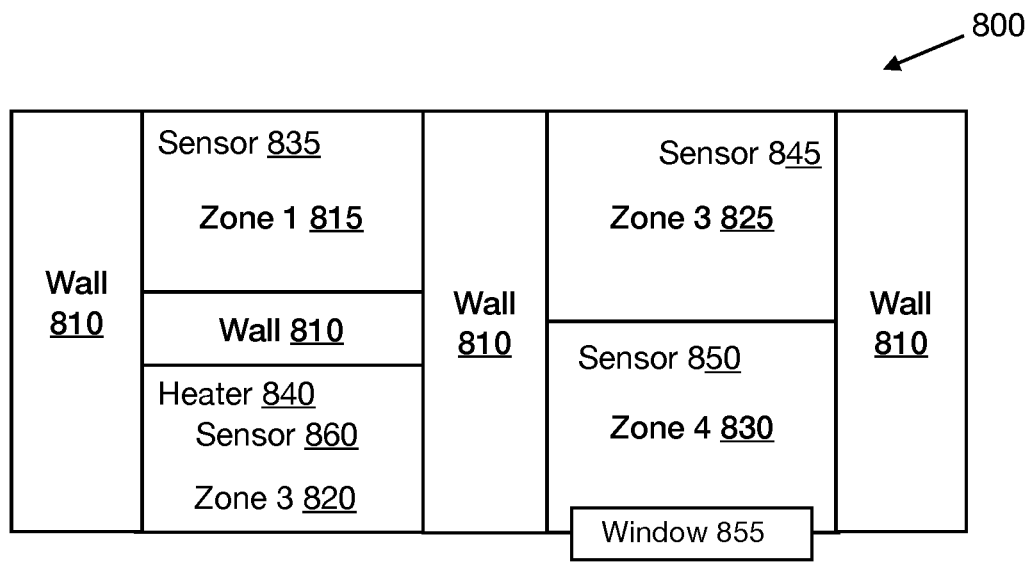
FIG. 8 is an exemplary diagram of a simplified location.

FIG. 8 is an exemplary diagram 800 of a simplified model of a physical space. In some embodiments, the controller can use sensors to cross-check themselves. This simplified physical space model 800 comprises the location of multiple sensors 835, 845, 850 and a heater 840 within a building portion that has multiple zones 815, 820, 825, 830. Walls 810, windows 855, and other features (not shown) are included in the model of the physical space that affect the way state, such as temperature, moves through the physical space. The physical space neural network may know where physical features like walls 810 and windows 855 are, and as such understands how far apart the various devices are from each other. The physical space neural network may understand the physical coordinates of devices, such as heaters, 840, such that the neural network understand how heat (or other state) is transported throughout the physical space, including through such features as walls and ceilings. Thus, when a heater 840 is on, a sensor 835 that is some number of feet away from the heater should register a value within a certain range, or there is a problem with the heater, the sensor, or the physical space configuration. Another sensor 845 some number of feet away with a wall between the heater 840 and the sensor 835, should register a temperature within a certain number of degrees from sensors 835 and 850. If sensor 835 reports the expected change in temperature when the heater is turned on, but sensor 850 does not, then one assumption that might be made is that sensor 850 is not working correctly, but sensor 835 and the heater are. If another sensor 845 records temperature in a different location that reflects the expected value when taking into account the distance from the heater, and the walls, etc. between them, then sensor 850 shows a good chance of having a flaw. In this way, sensors 835, 845, and 850 can perform cross-checks on each other. Other equipment within a physical structure can perform similar cross-checks.

Sensors can also be used to check that devices are properly commissioned. For example, a device, such as a heater 840 may be near a sensor 860 that reports on the state of the device. The plans for these sensors that help with commissioning may be put in at the design state, and then built such that the physical space can commission itself, as the sensor 860 will report if a device, e.g., heater 840 is operating correctly. These sensors may also help ensure that devices are running properly throughout the lifetime of the physical space. When a device is being commissioned, the controller may turn on the device for a certain time at a certain speed (if applicable) and then check the associated sensor. If the sensor changes state appropriately, then the device may have passed at least one test towards full commissioning. The device may affect multiple sensors, each of which may be checked by the controller. If the physical space uses multiple controllers, they may be connected using a distributed system, and so may be able to communicate such that sensors and devices wired to different controllers can automatically be used in the commissioning process.

Controllers also have access to databases of the physical space such that they can check that sensors in the space record the correct information for device activity, and sensors can cross-check each other for consistency.

Figure 9:
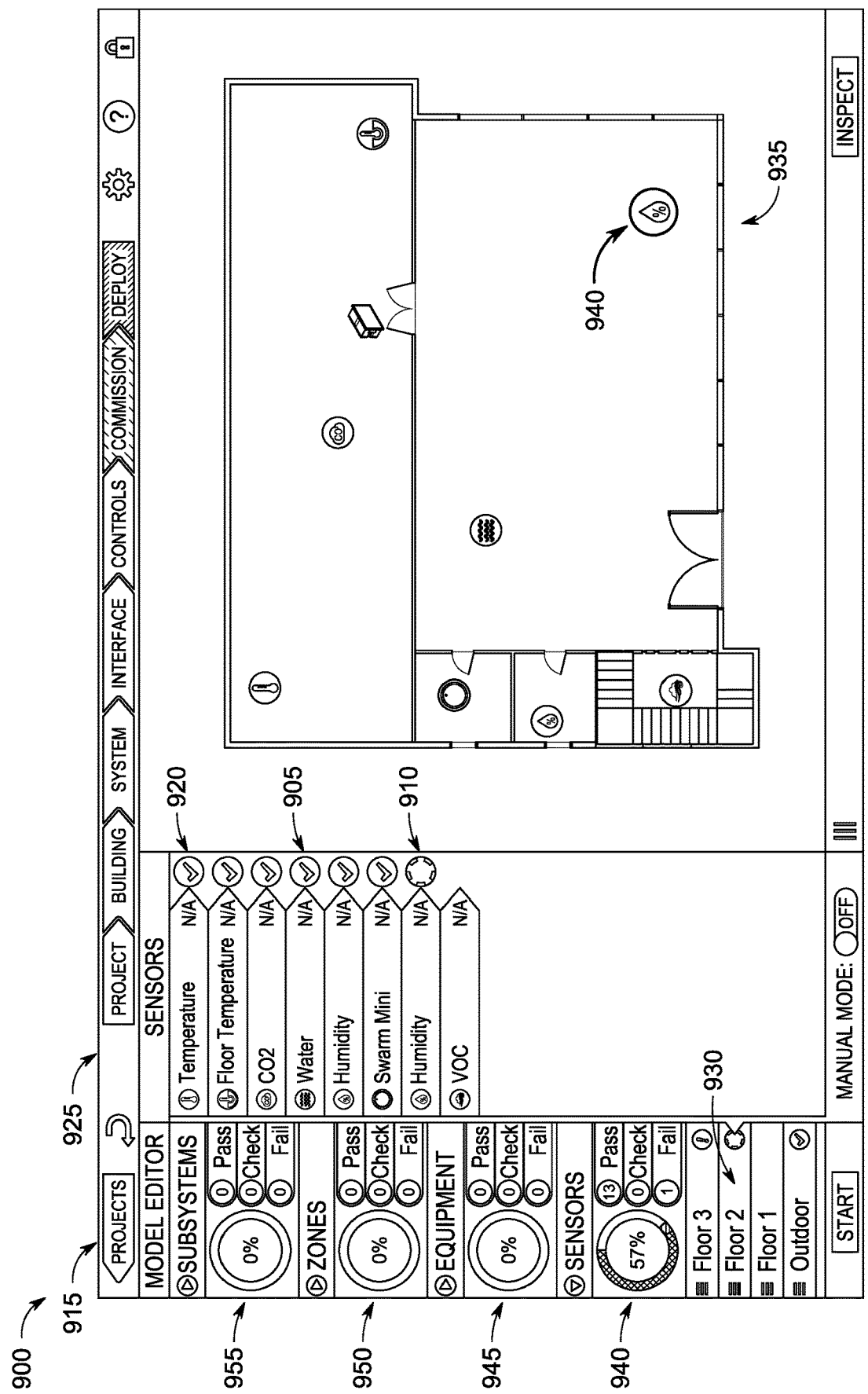
FIG. 9 is an exemplary screen shot illustrating some features of running the sensor commissioning process.

With reference to FIG. 9, an exemplary embodiment commissioning screen 900 is shown. In some embodiments, as sections of the physical space are commissioned, those sections may be displayed on a panel 930 on the progress report. These may be displayed such that the section of the physical space 915 (e.g., sensors, equipment, zones, subsystems) that is being commissioned is displayed have the portions that have passed, failed, or fall into the check category show up differentiated in some fashion, such as in different colors. An exemplary screenshot of such a display is shown. In it, a subsystem that is being commissioned is displayed.

In some embodiments, a list of the components (e.g., resources, sensors, devices) that are being commissioned is displayed, e.g., sequentially, with an icon 910 indicating that the component is being currently commissioned (e.g., as shown with reference to FIG. 2), along with the name of the component, e.g. temperature sensor 920. In this screenshot, automatic commissioning of the sensors (devices) on a floor 2 935 of a building is shown. Sensors that are to be commissioned are displayed on a panel 925. The portion of the building (in this case, the Floor 2), may be marked 930 (in this case with a star) in a panel. That portion of the building may be displayed 935 on the screen along with icons of the objects (device, sensor) being commissioned. Object names may be displayed in a panel 925; a mark is shown in the panel when the sensor is being automatically commissioned (in this case, a dashed-line circle indicting that a humidity sensor is being commissioned) 910. Another mark is shown (in this case, a check) when the sensor has been successfully commissioned 920. In some embodiments, during commissioning, the representation of the object being commissioned may be highlighted on the screen, e.g., 940, the humidity sensor icon that is currently being commissioned. The area of the building being automatically commissioned is shown in the right panel 935. The physical space model may be decided hierarchically, with each hierarchy step from lowest to highest, commissioned in turn. In the illustrative example, the hierarchical elements are shown in the far-left panel 915 from bottom to top, with the bottom sensors 940, being the lowest of the hierarchy and the first to be commissioned. Equipment 945 is at the same level or next level of hierarchy, then 950 zones are a step up in hierarchy, with subsystems 955 being the top of the hierarchy. Sensors are first checked, then the equipment, then zones, then subsystems. Other orders of commissioning are also within the scope of this disclosure.

Figure 10:
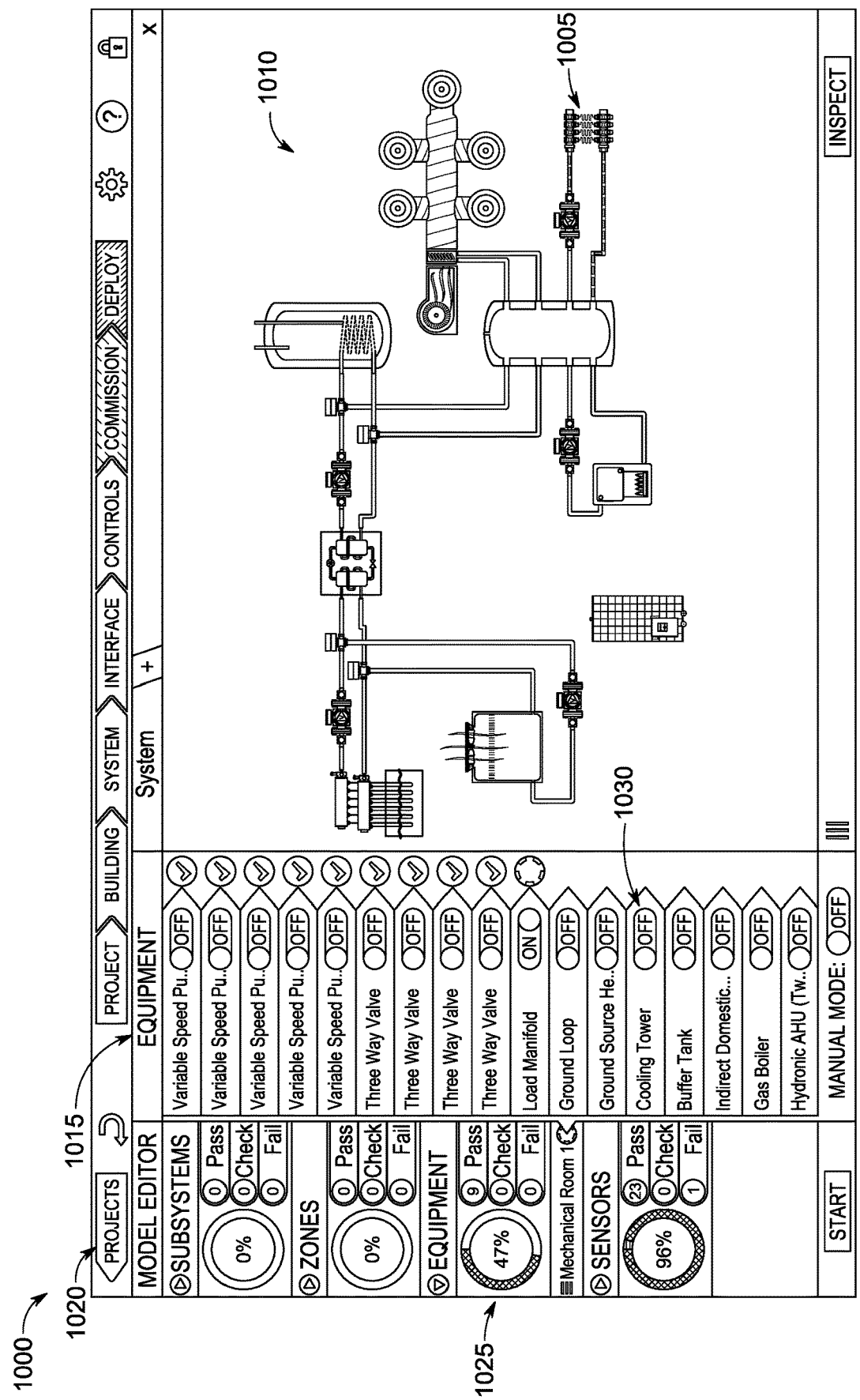
FIG. 10 is an exemplary screen shot illustrating some features of running the equipment commissioning process.

With reference to FIG. 10, an exemplary screenshot 1000 of equipment control loops being commissioned is shown. The equipment control loops are shown in the right panel 1010. The names of individual pieces of equipment 1005 in the control loops are shown in a panel 1015. This panel 1015 also shows whether or not a piece of equipment has been commissioned; here the same checks are used as seen in FIG. 9, though other methods are also envisioned. Whether a piece of equipment is on or off is also noted 1030. The far left panel 1020 shows progress of the automatic commissioning. In this snapshot 1025 47% of the equipment has been commissioned; 9 have passed, 0 checked, and 0 failed.

Figure 11:
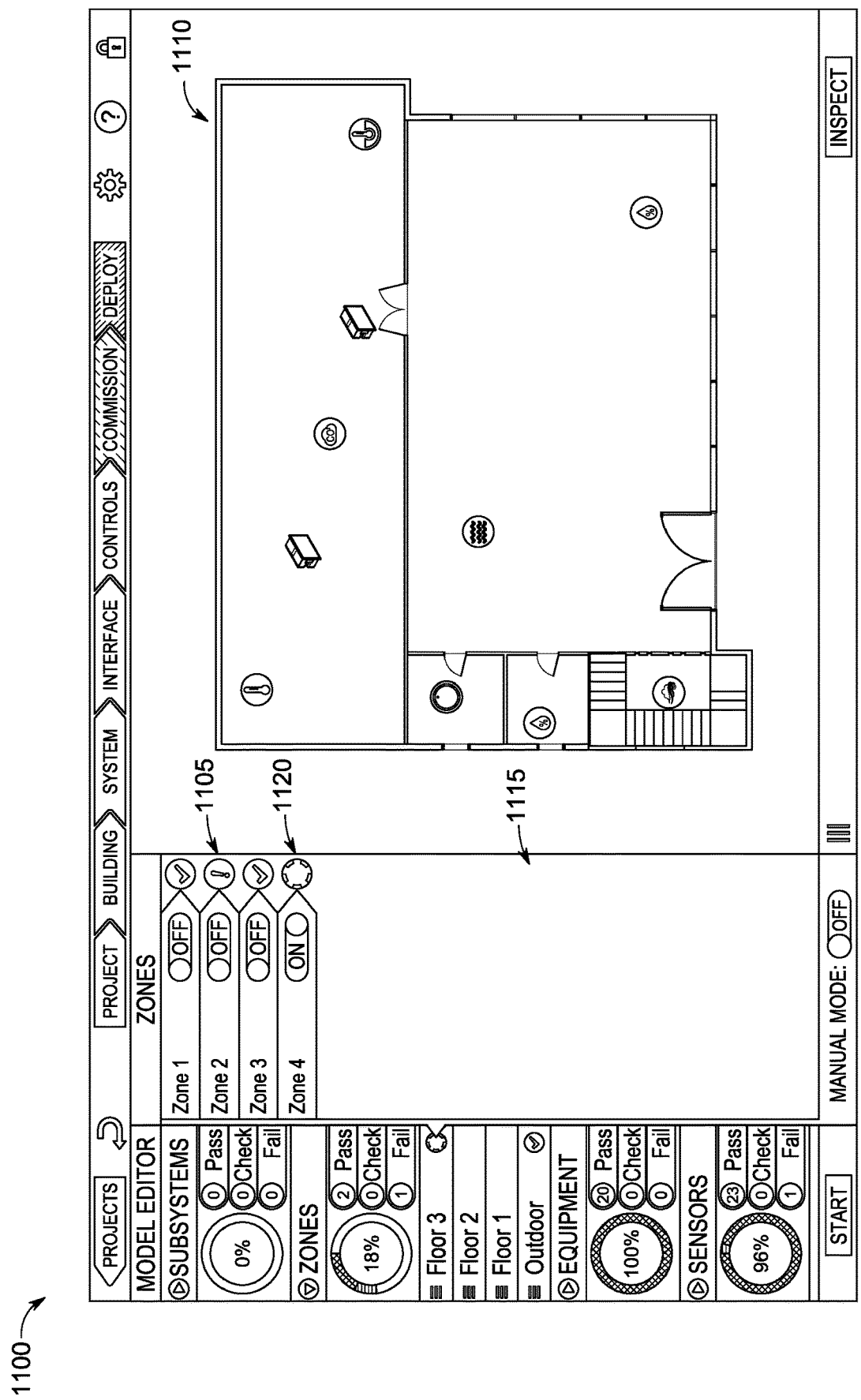
FIG. 11 is an exemplary screen shot illustrating some features of running the zone commissioning process.

With reference to FIG. 11, an exemplary embodiment screenshot 1100 shows zones of the building being commissioned. In this instance, the floor the zones are on are displayed in the right panel 1110. The zone itself being commissioned is shown in a middle panel 115. As the zones are commissioned, a mark is displayed 1120 in the middle panel 1115 indicating that commissioning is currently occurring. In this illustrative example, a spinning circle indicates current commissioning, but other marks are envisioned. As the zones are commissioned, they are displayed (with a check, by changing color, intensity of color, or by another method) in the middle panel 1115. In zone 2, an error has been found, which is indicated by a distinctive mark 1105, in this illustrative example, an explanation point.

Figure 12:
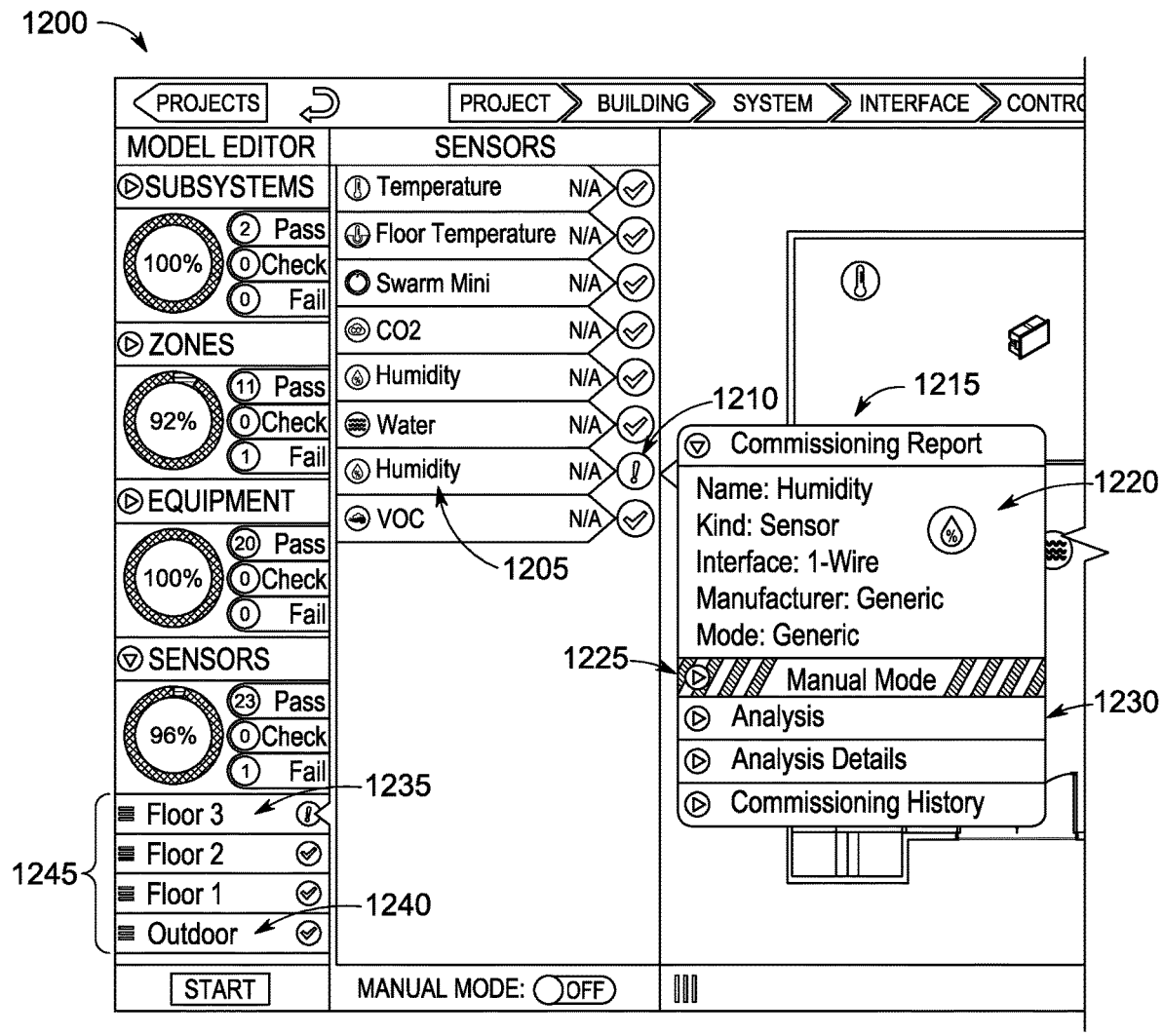
FIG. 12 is an exemplary screen shot illustrating some features of handling errors that occur in some implementations of the commissioning process.

With reference to FIG. 12, an exemplary embodiment commissioning screenshot 1200 is shown. In an embodiment, when an error is discovered, the commissioning screen provides information about that specific error. The overall location of the error many be indicated with a distinctive mark indicating what larger hierarchical grouping the error has occurred in. In the instant example, four major groupings 1245, Outdoor, Floor 1, Floor 2, Floor 3. "Floor 3" 1235 has an indication (!) that there is a commissioning error on this floor. "Outdoor" 1240 has an indication (✓, in the instant case) showing that this grouping has passed commissioning. Selecting a device 1205 with an indicated error 1210 brings up a screen 1215 that tells more information 1220 about the device 1205, such as name, the kind of device, the interface, the manufacturer, the mode, etc. Dropdown menus are also included in the illustrative example 1215. In the described embodiment, the options are "Manual Mode" 1225, "Analysis" 1230, "Analysis Details," and "Commissioning History".

Figure 13:
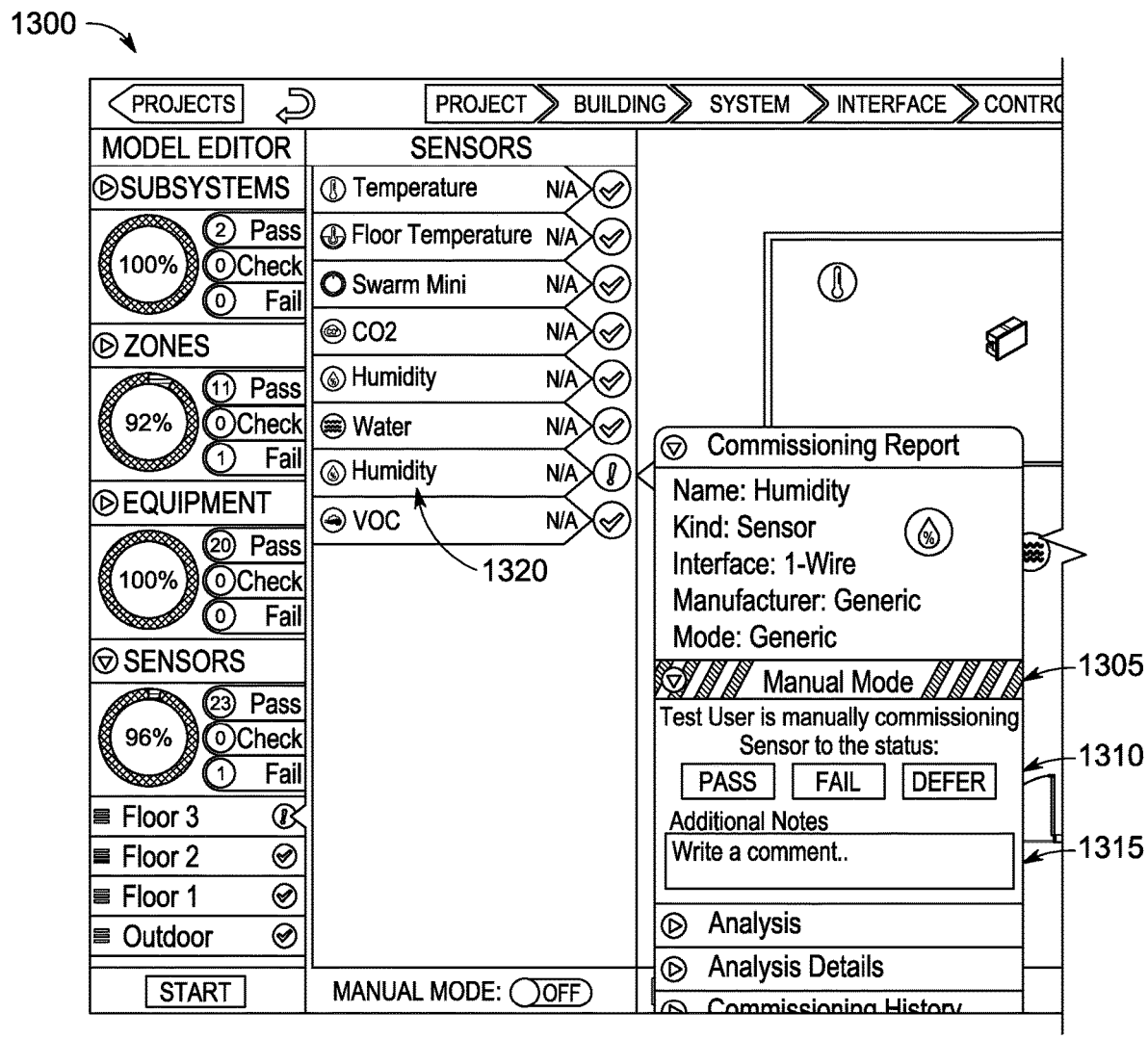
FIG. 13 is an exemplary screen shot illustrating some more features of handling errors that occur in some implementations of the commissioning process.

FIG. 13 discloses an exemplary commissioning screenshot 1300 with a commissioning report drawer open to display manual mode 1305. Once chosen, the user can manually choose 1310 to pass the device in question (here a humidity sensor 1320), fail the device, or defer until a later time. If the device is manually passed, (by, e.g., selecting the pass button) the automatic commissioning system will pass the device in that it will consider the device correctly commissioned with no further action. If the device is failed, the automatic commissioner will consider the device to have failed the automatic commissioning until the user passes it using this screen, or the device is automatically commissioned again and passes, or until another action happens. If the device is deferred, the device will remain in its current state. A user can add notes 1315, which, in some embodiments, will become part of the permanent record. This allows users at a later date to have a full record at their fingertips of the building behavior down to specifics of commissioning of each device since installation.

Figure 14:
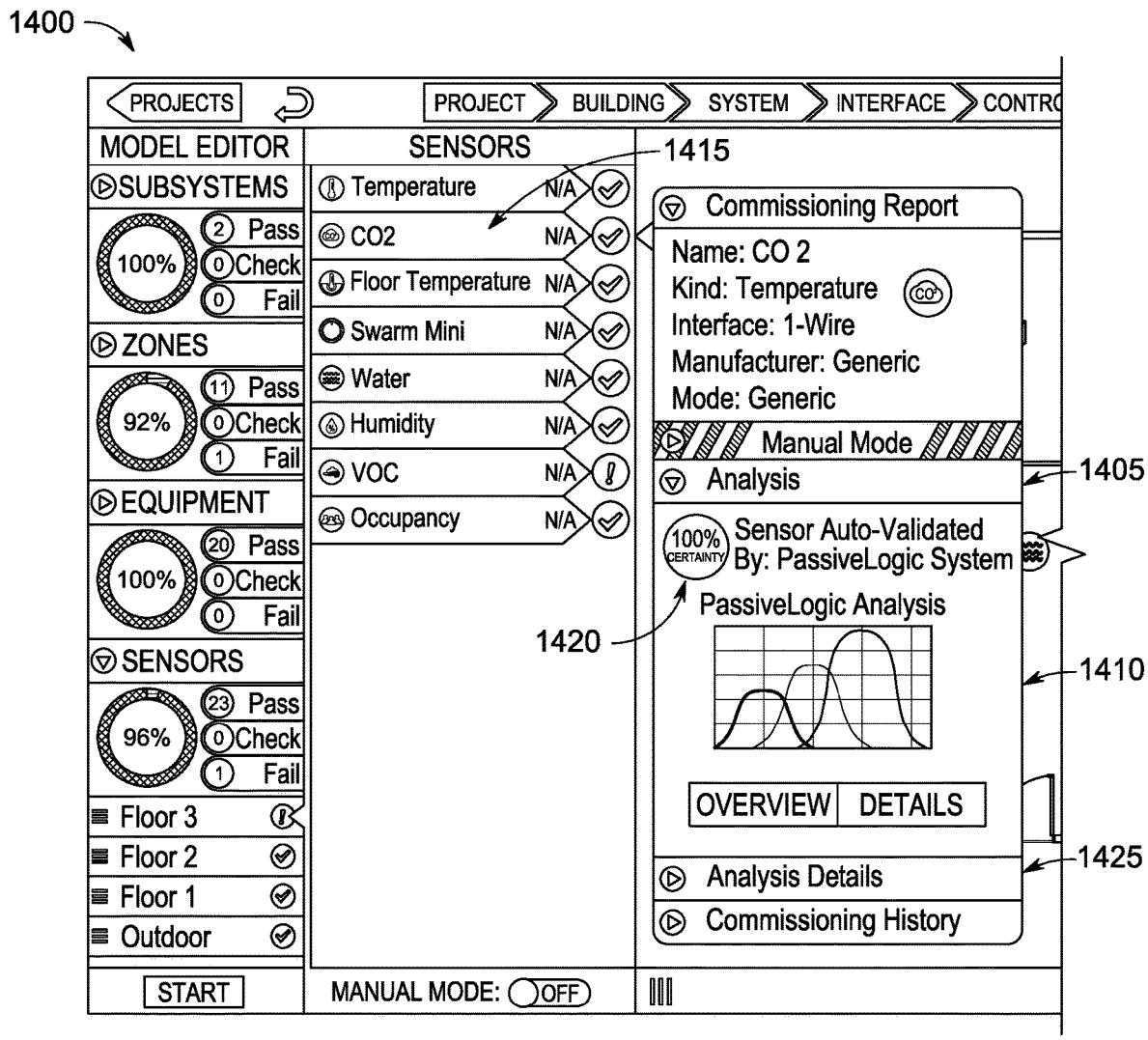
FIG. 14 is an exemplary screen shot illustrating some analysis features available in some implementations of the commissioning process.

FIG. 14 discloses a commissioning screenshot 1400 with a commissioning report drawer open to display analysis. When a device has a commissioning challenge, there are many resources to help determine what the matter might be. Opening the drawer "Analysis" 1405 opens the analysis window 1410. It shows, for the chosen device (in this case, a $CO_2$ sensor 1415), the certainty that the commissioning is accurate 1420 (which is a record of how close the device results were to presumed perfect results), and a pictorial representation indicating more details, such as, if there were errors recorded, what percentage of the time the error(s) occurred, where the errors occurred, etc. This may be a statistical graph or a statistical reason, or may be derived from artificial intelligence means, from observed data, or some combination of the above, or in a different way. Devices may have components. In some implementations, the components of the device, and the percentage of those components that passed are shown. These may be shown by opening a further drawer, or using some other method. Similar details may be shown about the components that are shown about the device.

Figure 15:
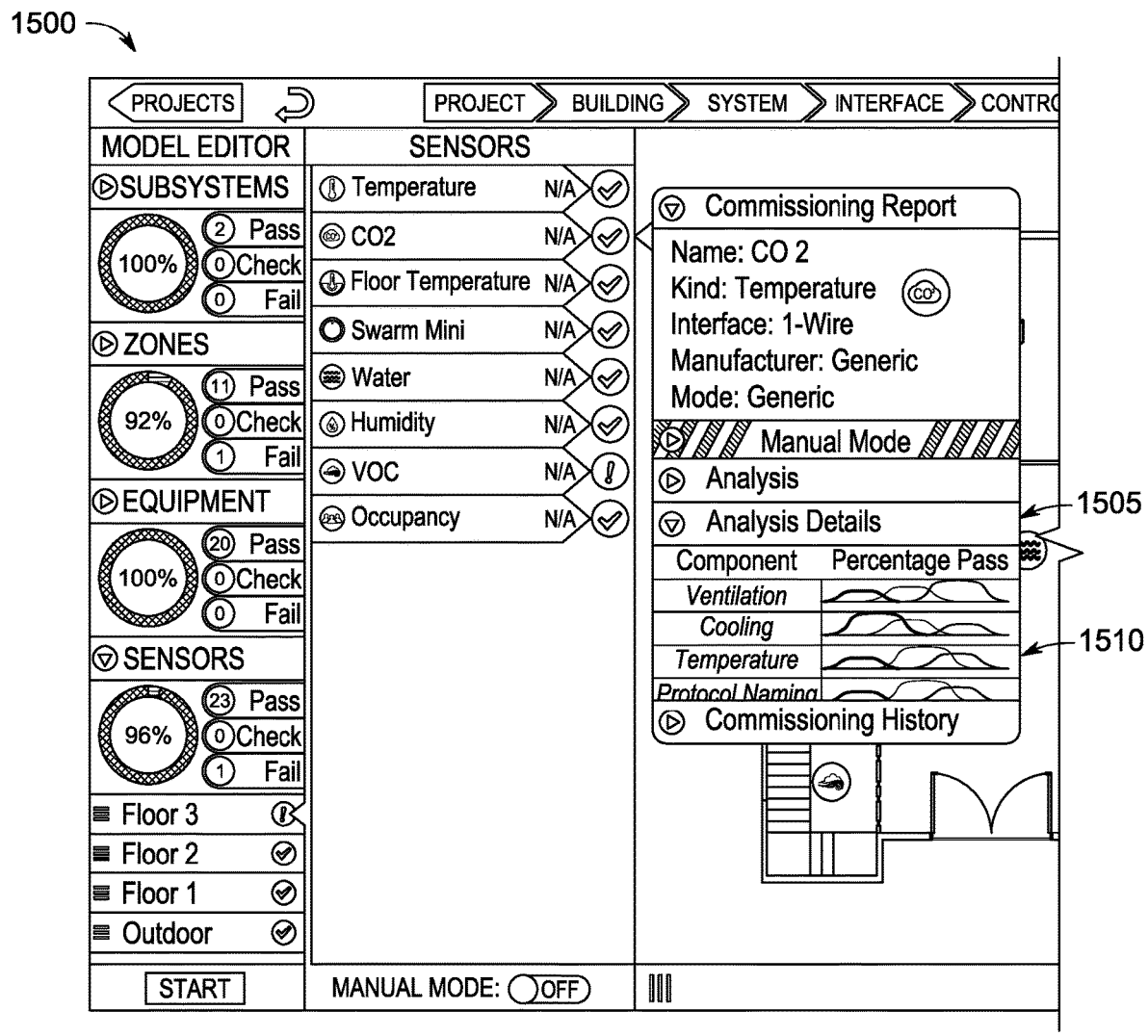
FIG. 15 is an exemplary screen shot illustrating some more analysis features available in some implementations of the commissioning process.

FIG. 15 discloses a screenshot 1500 with analysis details of the CO 2 device at 1505. Why a specific device failed may involve determining which specific portion of the device failed. This may be able to be determined by looking at provided analysis details. The illustrative screenshot 1500 shown in FIG. 15 discloses analysis details 1510 from the analysis drawer 1425. The components that are tested to commission device, and the percentage of those components that passed are shown. "Passing" may be a statistical function, an artificial intelligence calculation, may use historical data, or may use some combination of all of these to determine passing and failing. The data may be represented graphically, may be in text, may be in pictures, or may be some combination of the above. Knowing which portions are not "passing," e.g., not giving expected results, can show what specific parts of a structure may be behaving incorrectly. This may allow those portions to be honed in on to determine where difficulties are, and how much that difficulty determines the specific device has failed to pass.

Figure 16:
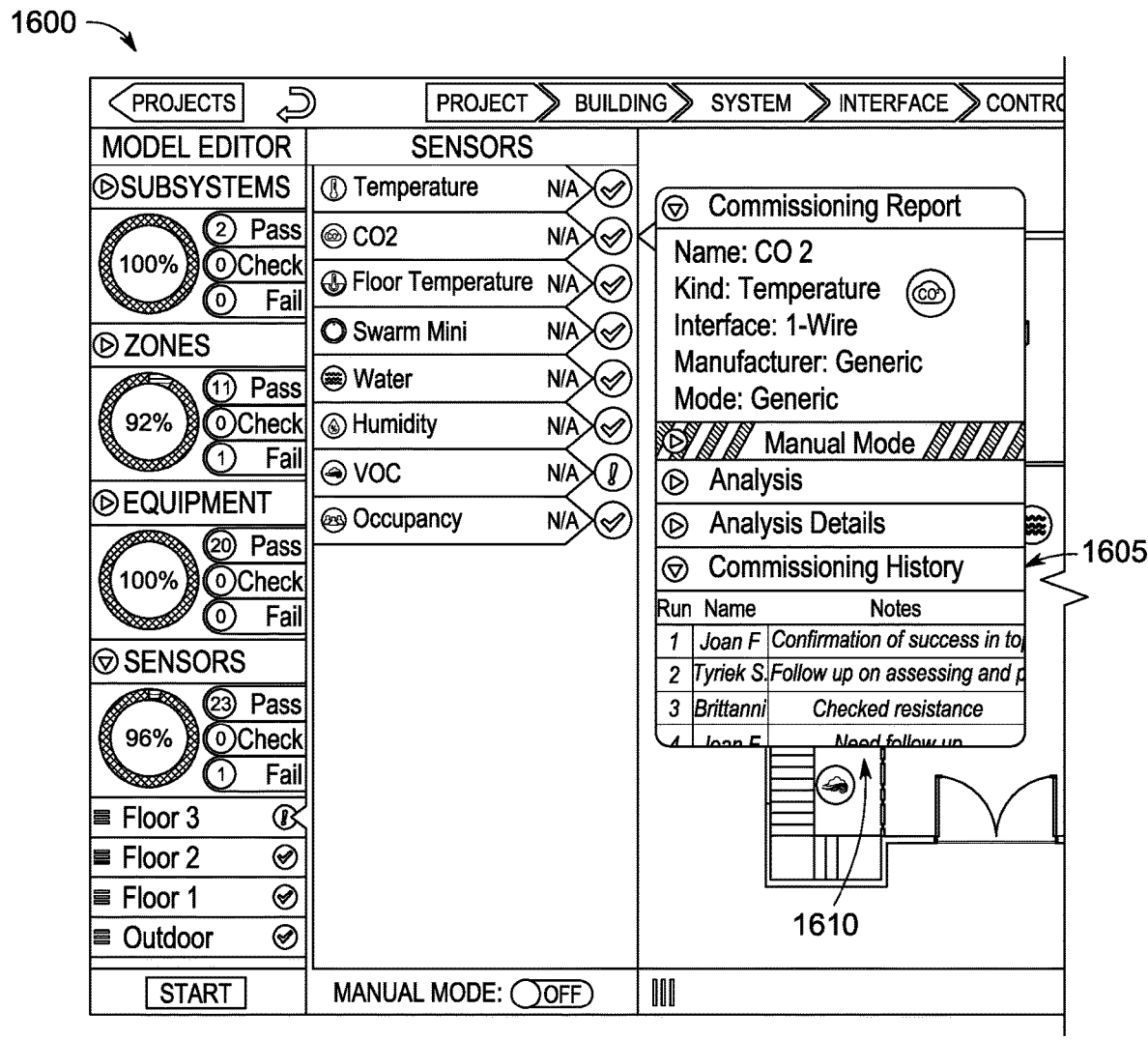
FIG. 16 is an exemplary screen shot illustrating some reporting features available in some implementations of the commissioning process.

FIG. 16 discloses a screenshot 1600 of a commissioning history 1605 of a device, e.g., a $CO_2$ sensor. In some embodiments a history of every commissioning event that happens since installation may be kept. The system may maintain an event log, may save snapshots, may save certain types of data, may sample data at certain times or for certain actions, etc. Reports may be available to help to understand the history of a device. In the illustrative example 1610, the information shown is a history of commissioning runs, a name of the person who, e.g. requested the commissioning run, and notes that can be written by a user. Other implementations may have other information stored.

Figure 17:
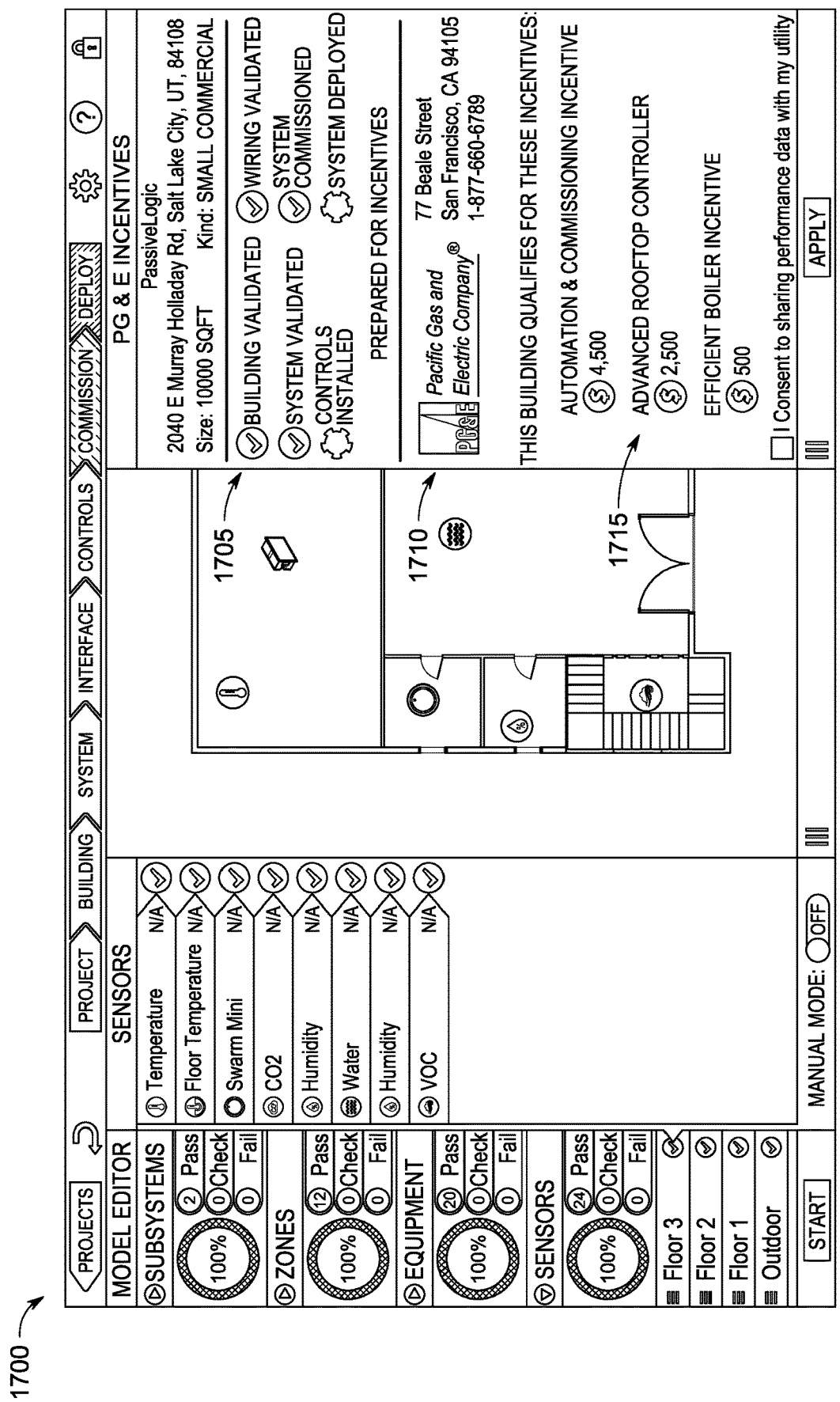
FIG. 17 is an exemplary screen shot illustrating some incentive features available in some implementations of the commissioning process.

FIG. 17 discloses an exemplary screenshot 1700 for an incentive checker. In embodiments, when a building has successfully been commissioned, the system may determine what type of incentives from government entities, utilities, etc., for which a building may be eligible. At 1705, the types of validation that a building has passed are shown. In this exemplary embodiment, it is shown that the building has been validated, the system has been validated, the wiring has been validated, the system commissioned, and the system deployed. The pane shown at 1710 displays incentives that this space is qualified for, and the organization that may give the incentives 1715.

Figure 18:
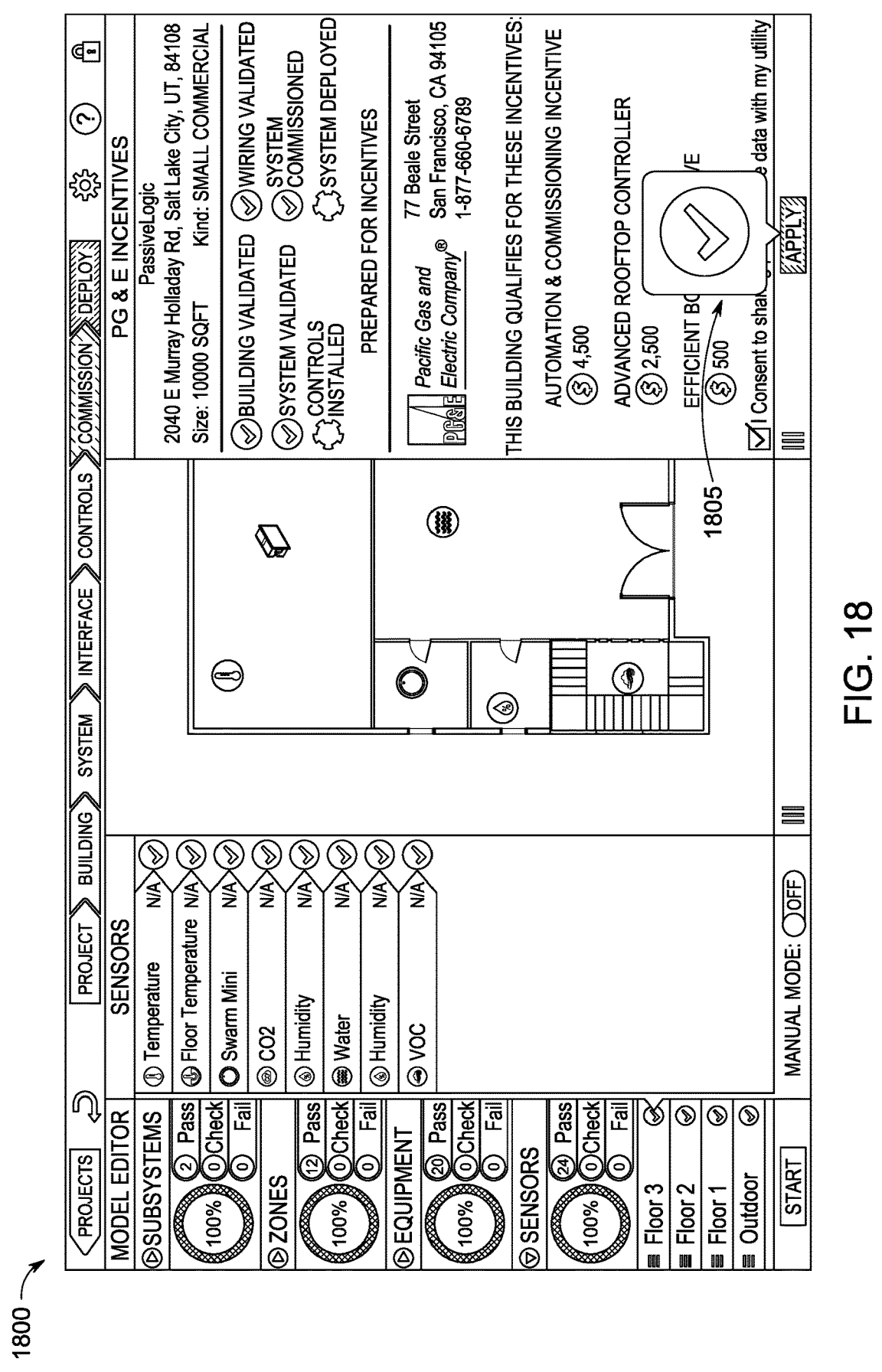

FIG. 18 discloses one method that may be used in some embodiments to apply for the incentives that are discovered. An "apply" button 1805 can be selected to apply for those incentives 1710.

Figure 19:
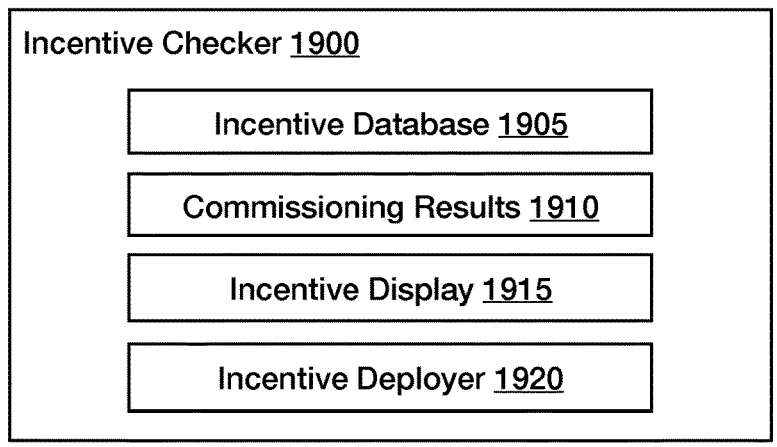
FIG. 19 is an exemplary block diagram illustrating some incentive checker features.

With reference to FIG. 19, a block diagram is shown that discloses aspects of an incentive checker 1900. At 1905, an incentive database may be used to keep track of incentives that are available for the physical space. These incentives may be uploaded automatically into the database from participating organizations, may be hand-input, may be placed in using a combination of automatic and hand input, or may be placed in using another method. The commissioning results 1910 are compared with the requirements for the incentives in the incentive database 1905. Those incentives that are found that meet the requirements are then displayed on an I/O device (e.g., 155) using an incentive display 1915 Screenshot 1700 discloses an illustrative example of such a display 1705. The entity offering the incentives, and contact info is shown (e.g., Pacific Gas and Power Company), as well as the specific incentives that the physical space is qualified for, the name of the incentive, and the amount that the incentive is worth 1710. At 1920, an incentive deployer is disclosed. This, in combination with the incentive database 1905 has the ability to apply for the incentives that the physical space is eligible for. It may do this by filling out forms using information gleaned from the automatic commissioning, and information about the specifics of applying for the incentives. It may create paperwork, and/or send the paperwork to the appropriate location. An example of applying for incentives is shown in screenshot 1800. In this illustrative example, a user checks "I consent to sharing performance data with my utility," and then is able to select an "apply" button 1805.

III. Exemplary System for Commissioning a Physical Space Automatically

Figure 20:
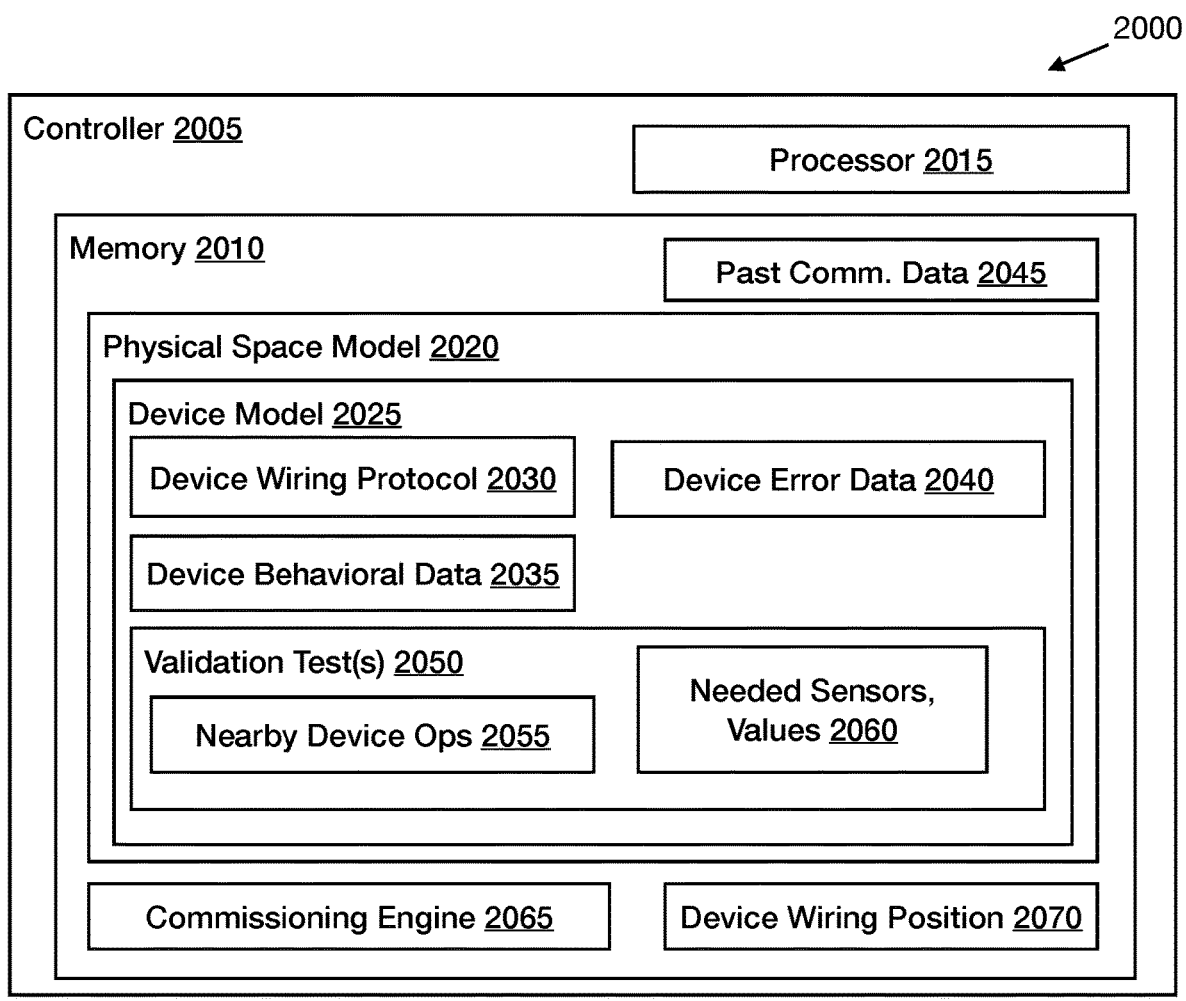
FIG. 20 is a functional block diagram showing an exemplary embodiment of a controller in a physical space in conjunction with which any of the described embodiments can be implemented.

FIG. 20 depicts one topology 2000 for commissioning a space automatically. In some embodiments, one or more controllers comprise one or more memories 2010 and one or more processors 2015. For simplicity, a single controller is shown. The controller(s) 2005 comprises a physical space model 2020, in some instances stored in memory 2010, which comprises a digital model of the physical space that is to be commissioned. Within this physical space model, there may be a model of a device 2025. This device model may be stored in memory 2010. In some embodiments, the device model is stored outside the physical space model. The device model 2025 may comprise a device wiring protocol 2030, device behavioral data 2035, device error data 2040, and past commissioning data 2045. Device wiring protocol 2030 indicates the protocol the device uses; specific device behavioral data 2035 indicates specific data associated with the device that may be useful during commissioning, and device error data indicates error messages that the device may send through its wiring. These categories may or may not overlap.

A building is often commissioned prior to its first opening, and then commissioned every three to five years after that. Some innovative embodiments, such as those illustrated in FIGS. 9-18, keep track of previous commissioning information 2045, such as previous commissioning done using the illustrated examples shown herein, including human-written notes from previous commissioning incidents stored within the system, such as those shown in FIG. 13 at 1315. The previous commissioning information is available when needed, such as when a building is commissioned again. Specific validation tests 2050 for certain devices may be included. These validation tests may involve certain other device operations 2055, such as a specific device being turned on and checked, and certain sensors being checked, and what their values should be 2060. For example, a smoke machine (a device) may be used for a certain amount of time, then after a second period of time a sensor at a certain location with the capability to check indoor air quality checks if the appropriate value is being recorded at the sensor. For another example, commissioning may require that a certain amount of humidity should be removed from the air within a given period of time. This may require both a vent be opened (a first device) and an air conditioner or other dehumidifier be turned on (a second device). Sensors may be built into a building to allow automatic commissioning to occur. For example, a sensor that monitors humidity may also need to be checked for within some range of a given value after a period of time. Other validation tests may require multiple sensors being checked, or it may require checking multiple functions of a multiple function sensor, such as, for example, indoor air quality and $CO_2$ concentration.

In some embodiments, commissioning engine 2065 runs the commissioning software using the processor 2015. In some embodiments, the running of the commissioning engine is divided over multiple processors running a distributed system.

Figure 22:
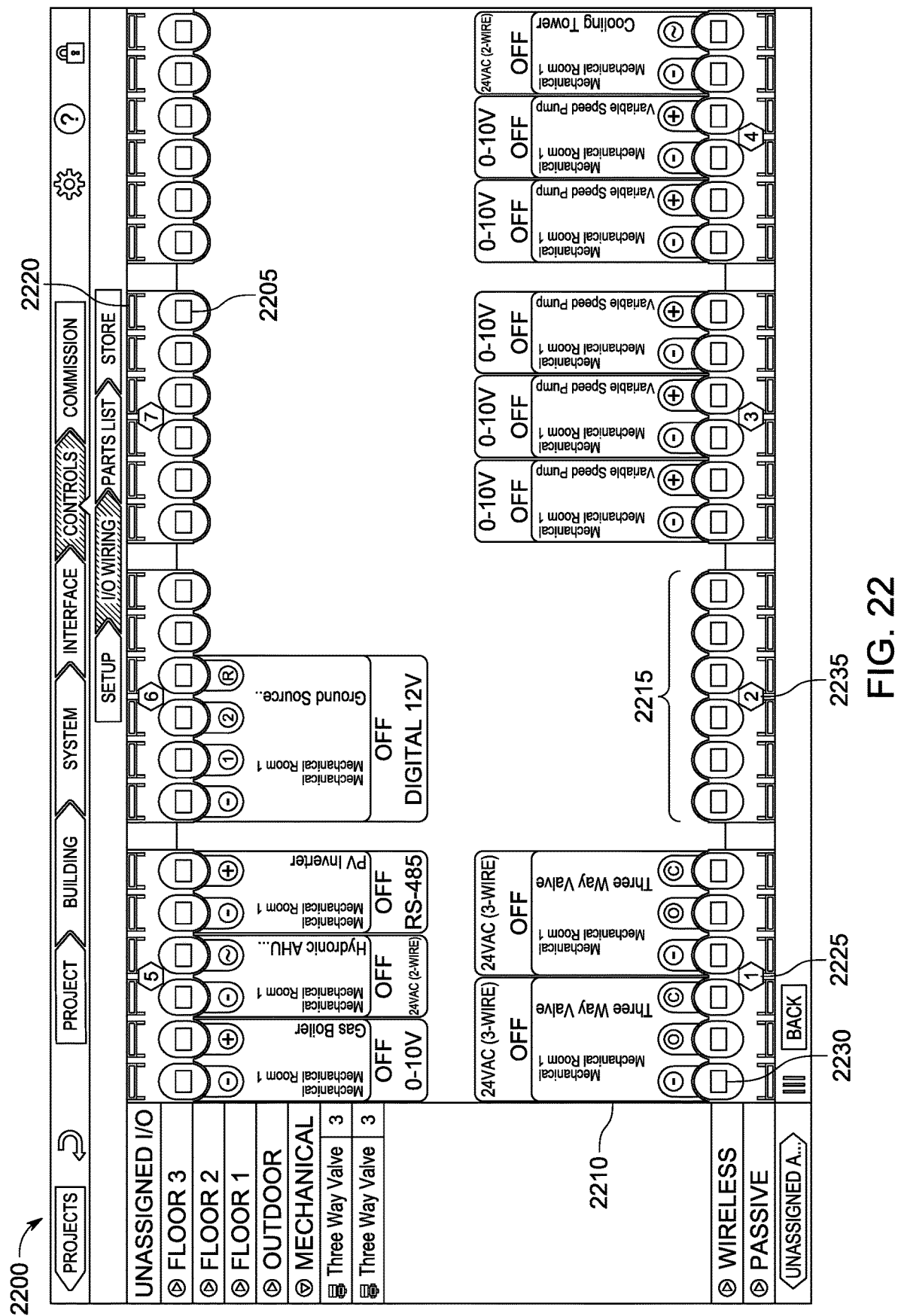
FIG. 22 is an exemplary screen shot illustrating some layout features available in some implementations of the commissioning process.

The device is expected to be wired to the controller at a specific position. If the device has multiple wires, each wire has its own location, its own protocol, etc. In some embodiments, this device wiring position information is stored with relationship to the controller itself. FIG. 22 gives an example of an embodiment with which specific devices can be designated to be wired to specific controller locations.

IV. Exemplary Method for Commissioning a Physical Space Automatically

Figure 21:
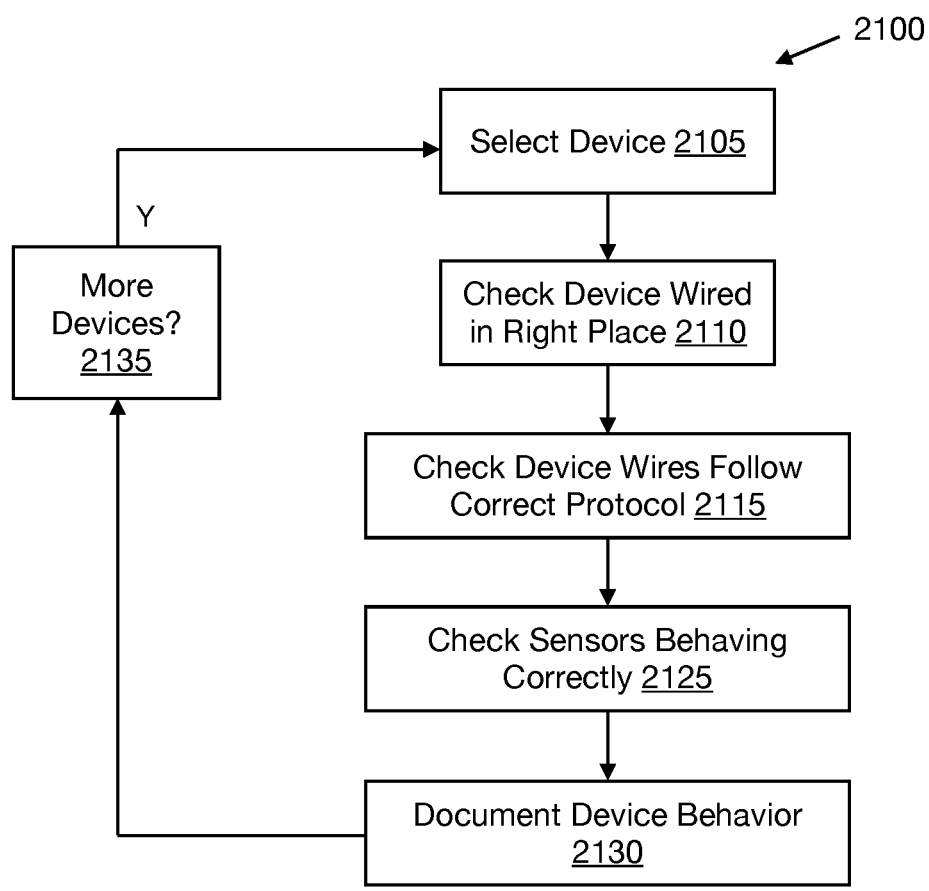
FIG. 21 is an exemplary flowchart of a commissioning process in conjunction with which some described embodiments can be implemented.

FIG. 21 illustrates a method 2100 for automatically commissioning a physical space. The operations of method 2100 presented below are intended to be illustrative. In some embodiments, method 2100 may be accomplished with one or more additional operations not described, and/or without one or more of the operations discussed. Additionally, the order in which the operations of method 2100 are illustrated in FIG. 21 and described below is not intended to be limiting.

In some embodiments, method 2100 may be implemented in one or more processing devices (e.g., multiple processors running in a distributed system with multiple controllers, a digital processor, an analog processor, a digital circuit designed to process information, an analog circuit designed to process information, a state machine, and/or other mechanisms for electronically processing information). The one or more processing devices may include one or more devices executing some or all of the operations of method 2100 in response to instructions stored electronically on an electronic storage medium. The one or more processing devices may include one or more devices configured through hardware, firmware, and/or software to be specifically designed for execution of one or more of the operations of method 2100.

At operation 2105, a device in the physical space that is to be commissioned is selected, e.g., by the commissioning engine. The physical space model (or a different location in memory) may have, in memory 2010, a model of the devices to be commissioned.

At operation 2110 the, e.g., commissioning engine 2065 checks that the device is wired to the correct position on the controller. FIG. 22 and the surrounding text gives an example of a screenshot associated with a controller that may be used to determine where a device should be wired on a controller.

At operation 2115, the device wires are checked to see if they follow the correct protocol. The correct protocol can be found, e.g., in a device wiring protocol 2030 database location stored with the device model 2025. There may also be a separate device wiring position 2070, or those may be included in the device wiring protocol. The information about the device may be already understood by the controller, and stored in a database, the information about the device protocol may be input by a user, such that the controller has access to it, or a combination of the two may be used.

At operation 2125, the sensors are checked to see if they are exhibiting expected behaviors, depending on device state. As discussed with relation to nearby sensor values 2060, to determine if a device is operating appropriately, a sensor may need to be checked. For example, to check if an air conditioner is working appropriately, a nearby sensor that checks temperature needs to be identified, or may already be identified. The temperature on the sensor then needs to be checked; the air conditioner needs to be turned on for a certain time by the controller using the air conditioner protocol stored in memory in the controller (or a controller within a distributed controller system); then the sensor needs to be checked again to see if the temperature has changed by the desired amount. If it has, the device passes the commissioning, if the temperature has not decreased by the required amount, then the device has either failed, or needs checking.

At operation 2130, device behavior is documented and stored such that it can be retrieved. This documentation is such that it can be retrieved when desired. This may be stored by methods known to those of skill in the art.

At operation 2135, it is determined if there are more devices to be checked. If so, then the method continues from operation 2105, until the devices that are to be commissioned are checked.

FIG. 22 illustrates aspects of a system architecture which is suitable for use with any of the commissioning embodiments described herein. The illustrative screenshot embodiment 2200 allows a user to view or specify the expected device layout of a controller. A controller is wired to a device through a controller connector, a module connector that itself connects to a controller, etc. In this example, a controller connector is shown at 2220. This controller connector is attached to a module connector 2205. Modules 2215 are indicated on the screen using grouped, numbered 2235 module connectors 2205. This module 2215 has six module connectors that will connect to devices. This controller represented in screen 2200 has eight potential module locations, one of which are currently empty. Other numbers of modules in a controller, and device connectors in a module are also within the scope of this disclosure.

The specific devices that are to be wired to the controller are shown as device icons attached to their respective module connecters. At 2210, for example, we can see that the device is a Three Way Valve, with a 24 VAC (3-wire) protocol. It is attached to module 1 2225. It has three wires, which are of type (−), (O), and (C) from left to right, and which are in three distinct locations on the controller. When, for example, a device wire is wired to the lower left connection 2230 of the controller, the controller knows that it is to be a wire on a Three-Way Valve, with protocol 24 VAC (3-WIRE) and the specific wire is to be of type (−). Using this information, the controller can see what information is on the wire when connected, what signals the wire accepts, and what signals the wire is expected to return, etc. When the wire is connected to the controller, the controller understands what to do to test if the correct wire has been connected to that direct controller location. If wires have been swapped on a device (for example, the (−) and (O) wires are swapped such that the (O) wire is in the far lower left position 2230, the controller may be able to determine this, as it has the information about what signals can be expected to be sent and received on the wires. If the correct wire has been connected, then the controller may send a message to the module (through the module connecter and the circuit board) to tell an indicator 2235 on the module to signal that the correct wire is in place. In some embodiments, the indicator may indicate that the wire is correct with a light, such as a green LED light, a noise, etc. In some embodiments, the indicator may indicate that the wire is incorrect with a light, such as a red LED light, a noise, etc. In some embodiments, when a wire is connected in the module (the module in the controller, the controller having been told what wire to expect) the light will light up green if the correct wire is found to be connected (by the controller, module, or a combination) or will light up red if the correct wire is not found to be connected (by the controller, module, or some other combination).

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

We claim:

1. A method for verifying controlled devices attached to a controller, the method comprising:
    selecting, using a system model that models a system of devices comprising the controlled devices attached to the controller, a grouping of the system of devices to be tested;
    conducting a test of the grouping to produce a test result for the grouping, wherein conducting the test comprises transmitting a communication to at least one device associated with the grouping;
    choosing a graphical representation of a portion of the system model from a plurality of graphical representations based on the graphical representation including a representation of the grouping; and
    displaying, on a user interface, the graphical representation and an indication of the test result.

2. The method of claim 1, wherein conducting the test comprises:
    querying the system model to determine an expected behavior of the grouping in response to the communication; and
    after transmitting the communication, comparing an actual behavior of the grouping to the expected behavior.

3. The method of claim 1, wherein conducting the test comprises transmitting an additional communication to an additional device associated with the grouping and different from the at least one device.

4. The method of claim 1, wherein the communication comprises a request to read at least one value stored by the at least one device.

5. The method of claim 1, wherein the plurality of graphical representations comprise:
 a first graphical representation having a first view type that displays groupings of the system of devices on a floor plan at locations modeled by the system model; and
 a second graphical representation having a second view type different from the first view type that displays groupings of the system of devices as part of an equipment diagram that displays functional connections between devices modeled by the system model.

6. The method of claim 1, wherein the plurality of graphical representations comprises:
 a first graphical representation that displays a first portion of the system model; and
 a second graphical representation that displays a second portion of the system model that is different from the first portion.

7. The method of claim 1, wherein the grouping is at least one of: a sensor, a piece of equipment, a heating/cooling zone, and a subsystem of equipment.

8. The method of claim 1, wherein:
 the grouping has a first grouping type,
 the system model defines a second grouping having a second grouping type different from the first grouping type, and
 displaying, on a user interface, the graphical representation and an indication of the test result comprises additionally displaying indications of:
  a first test status of groupings having the first grouping type, and
  a second test status of grouping having the second grouping type.

9. The method of claim 8, wherein the first grouping type and the second grouping type are hierarchically arranged, whereby the grouping having the first grouping type is combined with at least one additional grouping to form the second grouping.

10. The method of claim 8, further comprising repeating the steps of selecting, conducting, choosing, and conducting to iterate first through a first plurality of groupings having the first grouping type and then through a second plurality of groupings having the second grouping type.

11. The method of claim 1, further comprising, while performing the step of conducting the test:
 displaying the graphical representation together with an indication that the test is in progress, wherein the indication that the test is in progress is displayed as part of the graphical representation at a position associated with the grouping.

12. A controller for verifying controlled devices, the controller comprising:
 a plurality of wiring pins configured to communicate with a plurality of devices of a system of devices;
 a memory storing a system model that models the system of devices,
 a display device, and
 a processor configured to:
  select, using the system model, a grouping of the system of devices to be tested;
  conduct a test of the grouping to produce a test result for the grouping, wherein conducting the test comprises transmitting via at least one of the plurality of wiring pins a communication to at least one device associated with the grouping;
  choose a graphical representation of a portion of the system model from a plurality of graphical representations based on the graphical representation including a representation of the grouping; and
  display, via the display device, the graphical representation and an indication of the test result.

13. The controller of claim 12, wherein, in conducting the test, the processor is configured to:
 query the system model to determine an expected behavior of the grouping in response to the communication; and
 after transmitting the communication, compare an actual behavior of the grouping to the expected behavior.

14. The controller of claim 12, wherein the plurality of graphical representations comprise:
 a first graphical representation having a first view type that displays groupings of the system of devices on a floor plan at locations modeled by the system model; and
 a second graphical representation having a second view type different from the first view type that displays groupings of the system of devices as part of an equipment diagram that displays functional connections between devices modeled by the system model.

15. The controller of claim 12, wherein the plurality of graphical representations comprises:
 a first graphical representation that displays a first portion of the system model; and
 a second graphical representation that displays a second portion of the system model that is different from the first portion.

16. The controller of claim 12, wherein:
 the grouping has a first grouping type,
 the system model defines a second grouping having a second grouping type different from the first grouping type, and
 in displaying, on a user interface, the graphical representation and an indication of the test result, the processor is configured to additionally display indications of:
  a first test status of groupings having the first grouping type, and
  a second test status of grouping having the second grouping type.

17. The controller of claim 16, wherein the first grouping type and the second grouping type are hierarchically arranged, whereby the grouping having the first grouping type is combined with at least one additional grouping to form the second grouping.

18. The controller of claim 16, wherein the processor is configured to repeat the steps of selecting, conducting, choosing, and conducting to iterate first through a first plurality of groupings having the first grouping type and then through a second plurality of groupings having the second grouping type.

19. The controller of claim 12, wherein the processor is further configured to, while performing the step of conducting the test:
 display the graphical representation together with an indication that the test is in progress, wherein the indication that the test is in progress is displayed as part of the graphical representation at a position associated with the grouping.

20. A machine-readable storage medium encoded with instructions for execution by a processor for verifying controlled devices attached to a controller, the machine-readable storage medium comprising:
  instructions for selecting, using a system model that models a system of devices comprising the controlled devices attached to the controller, a grouping of the system of devices to be tested;
  instructions for conducting a test of the grouping to produce a test result for the grouping, wherein conducting the test comprises transmitting a communication to at least one device associated with the grouping;
  instructions for choosing a graphical representation of a portion of the system model from a plurality of graphical representations based on the graphical representation including a representation of the grouping; and
  instructions for displaying, on a user interface, the graphical representation and an indication of the test result.

21. The machine-readable storage medium of claim 20, wherein the instructions for conducting the test comprise:
  instructions for querying the system model to determine an expected behavior of the grouping in response to the communication; and
  instructions for, after transmitting the communication, comparing an actual behavior of the grouping to the expected behavior.

22. The machine-readable storage medium of claim 20, wherein the plurality of graphical representations comprise:
  a first graphical representation having a first view type that displays groupings of the system of devices on a floor plan at locations modeled by the system model; and
  a second graphical representation having a second view type different from the first view type that displays groupings of the system of devices as part of an equipment diagram that displays functional connections between devices modeled by the system model.

23. The machine-readable storage medium of claim 20, wherein the plurality of graphical representations comprises:
  a first graphical representation that displays a first portion of the system model; and
  a second graphical representation that displays a second portion of the system model that is different from the first portion.

24. The machine-readable storage medium of claim 20, wherein:
  the grouping has a first grouping type,
  the system model defines a second grouping having a second grouping type different from the first grouping type, and
  the instructions for displaying, on a user interface, the graphical representation and an indication of the test result comprise instructions for additionally displaying indications of:
  a first test status of groupings having the first grouping type, and
  a second test status of grouping having the second grouping type.

25. The machine-readable storage medium of claim 24, wherein the first grouping type and the second grouping type are hierarchically arranged, whereby the grouping having the first grouping type is combined with at least one additional grouping to form the second grouping.

26. The machine-readable storage medium of claim 24, further comprising instructions for repeating the execution of the machine-readable storage medium selecting, conducting, choosing, and conducting to iterate first through a first plurality of groupings having the first grouping type and then through a second plurality of groupings having the second grouping type.

27. The machine-readable storage medium of claim 20, further comprising instructions for, while performing the step of conducting the test:
  displaying the graphical representation together with an indication that the test is in progress, wherein the indication that the test is in progress is displayed as part of the graphical representation at a position associated with the grouping.

* * * * *